Feb. 11, 1936. H. R. SCHUTZ 2,030,328
GLASS WORKING APPARATUS
Filed July 11, 1932 28 Sheets-Sheet 1
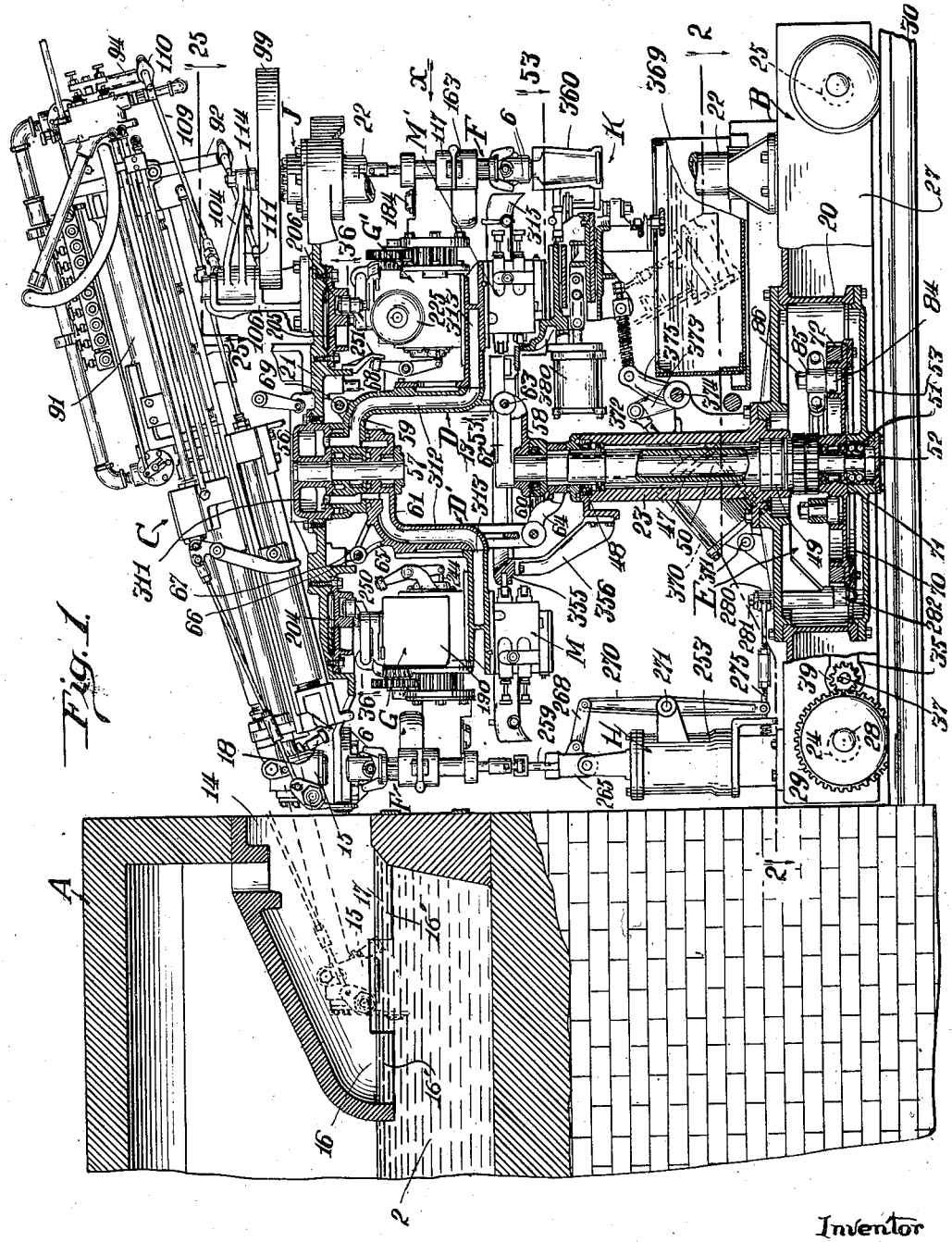
Inventor
Harold R. Schutz

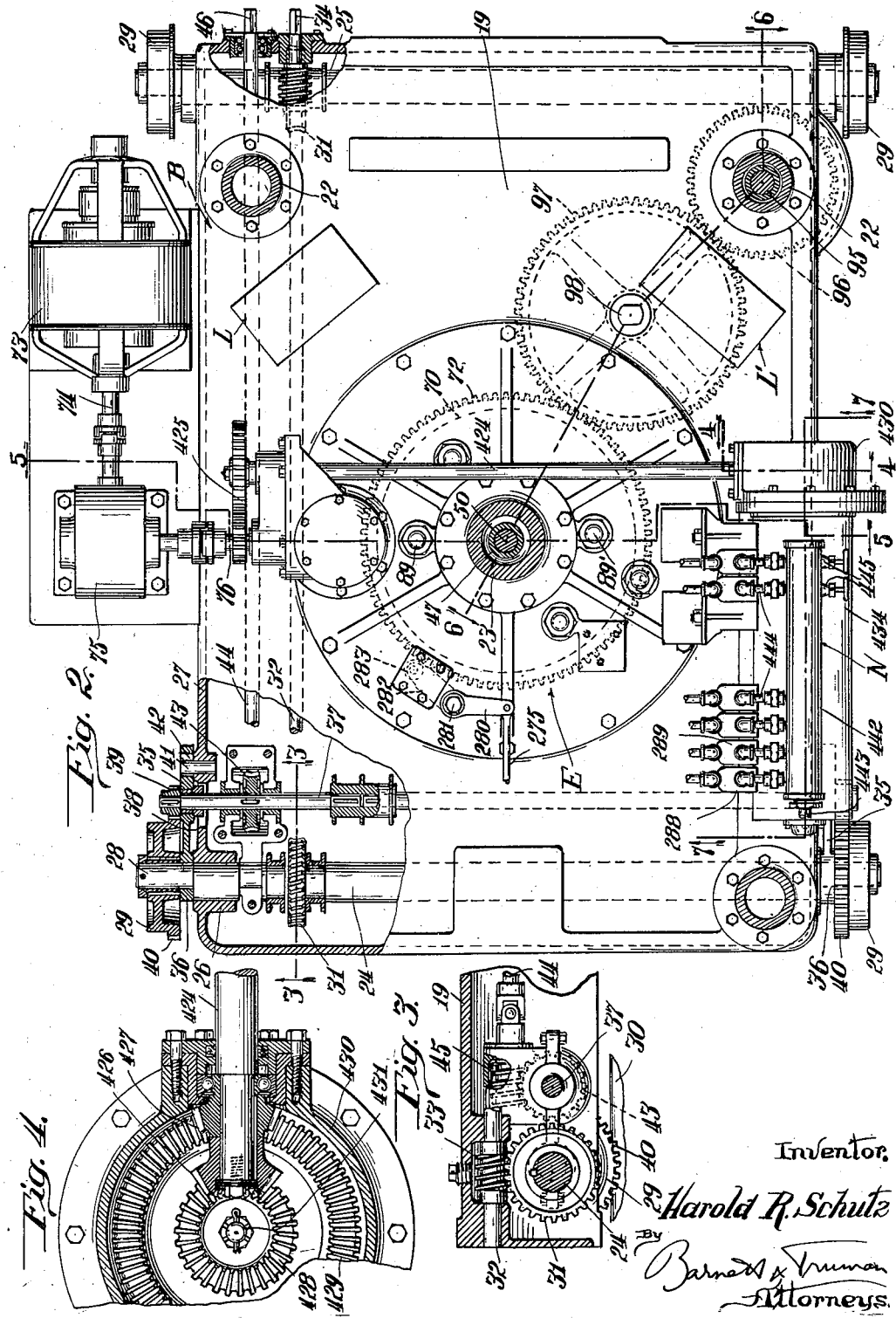

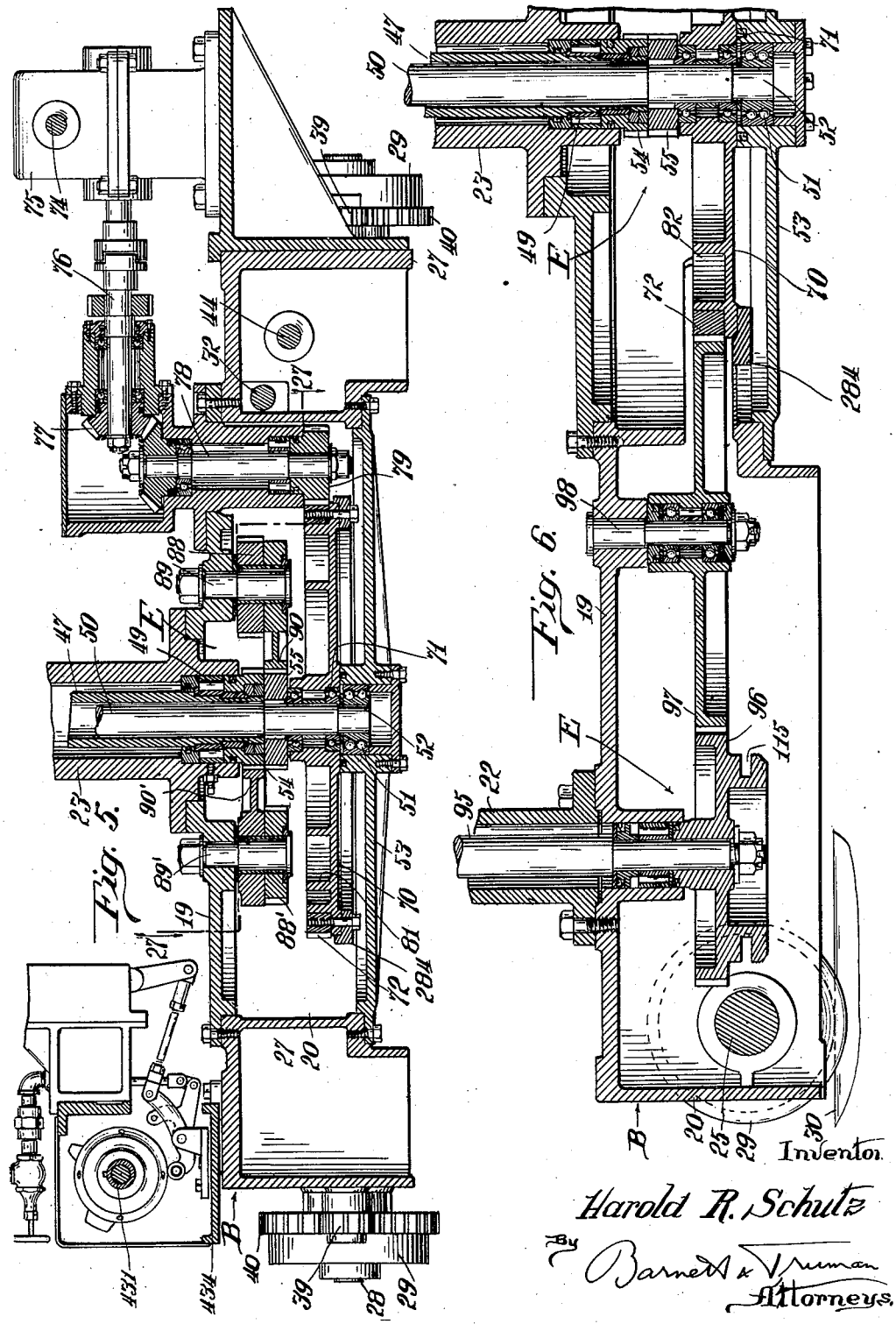

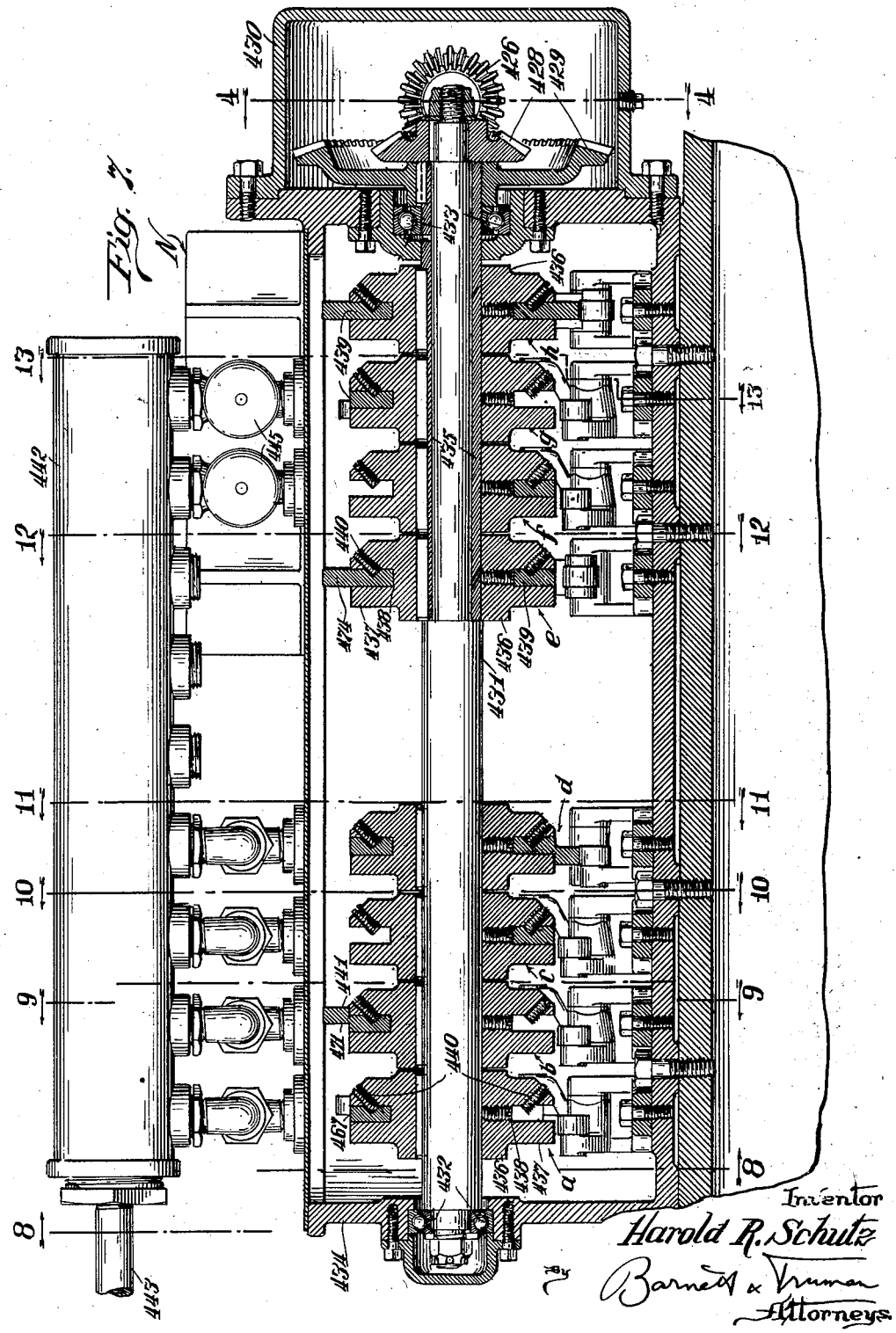

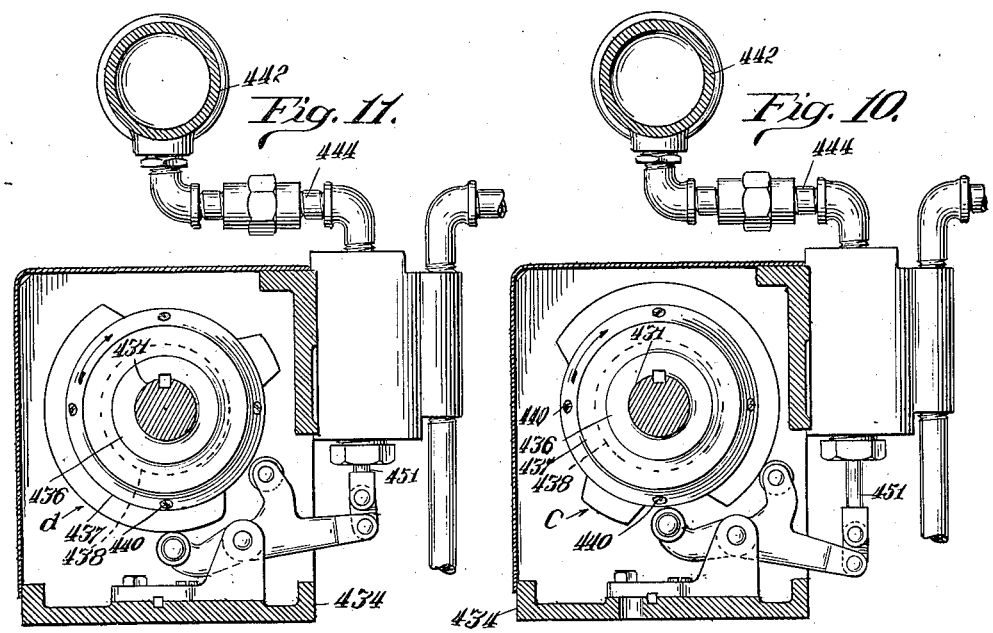
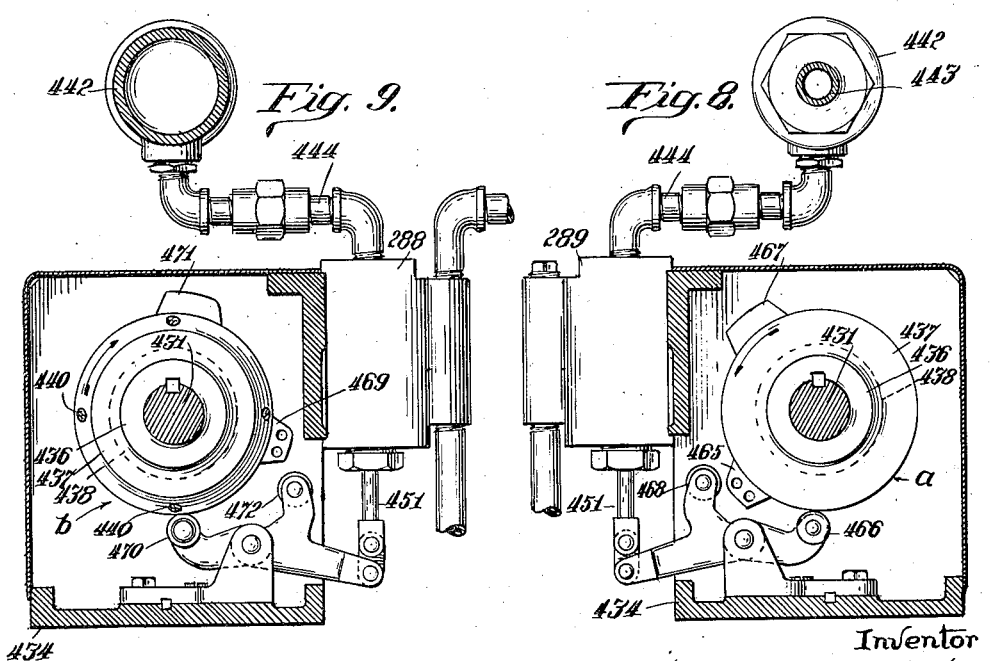

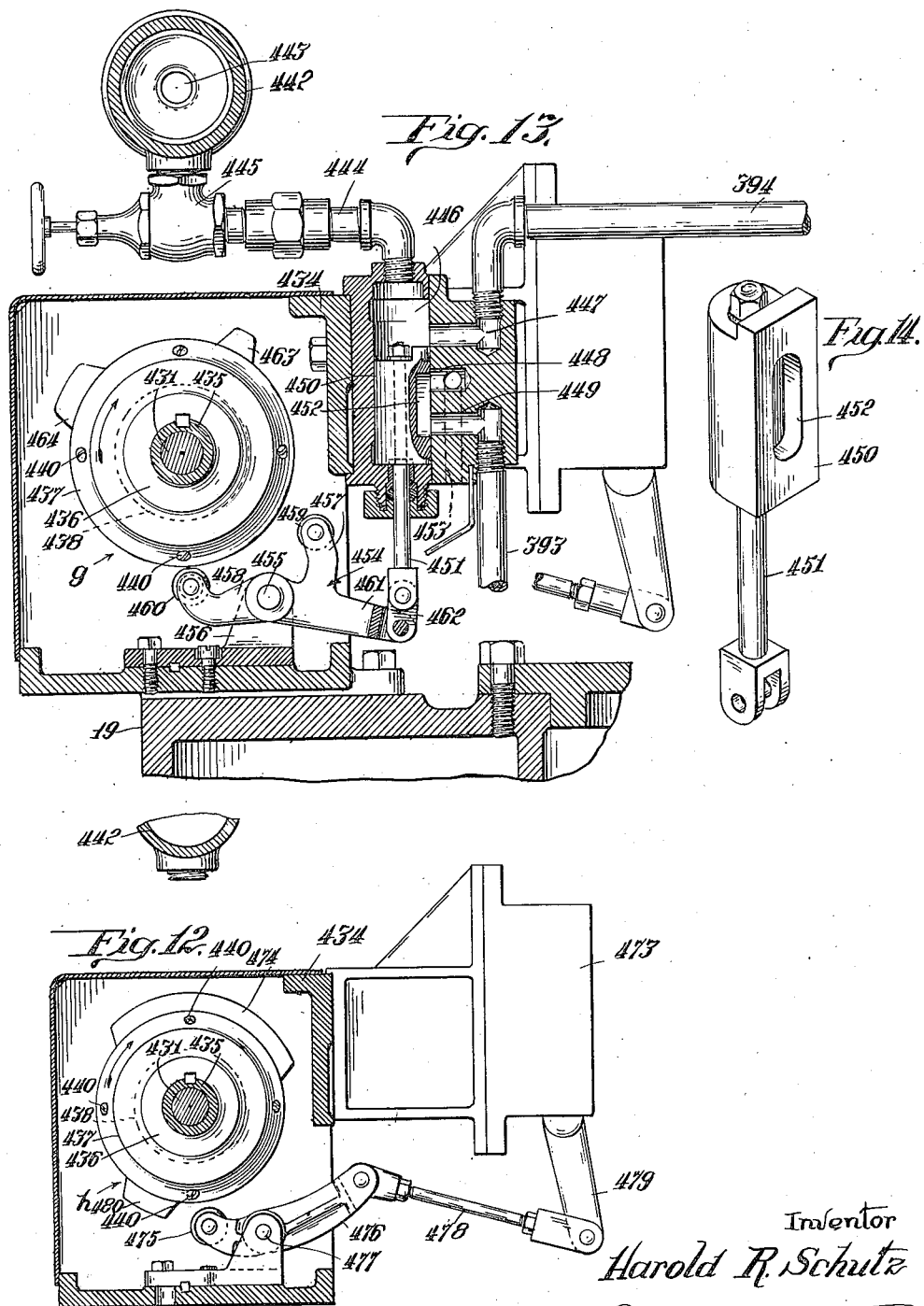

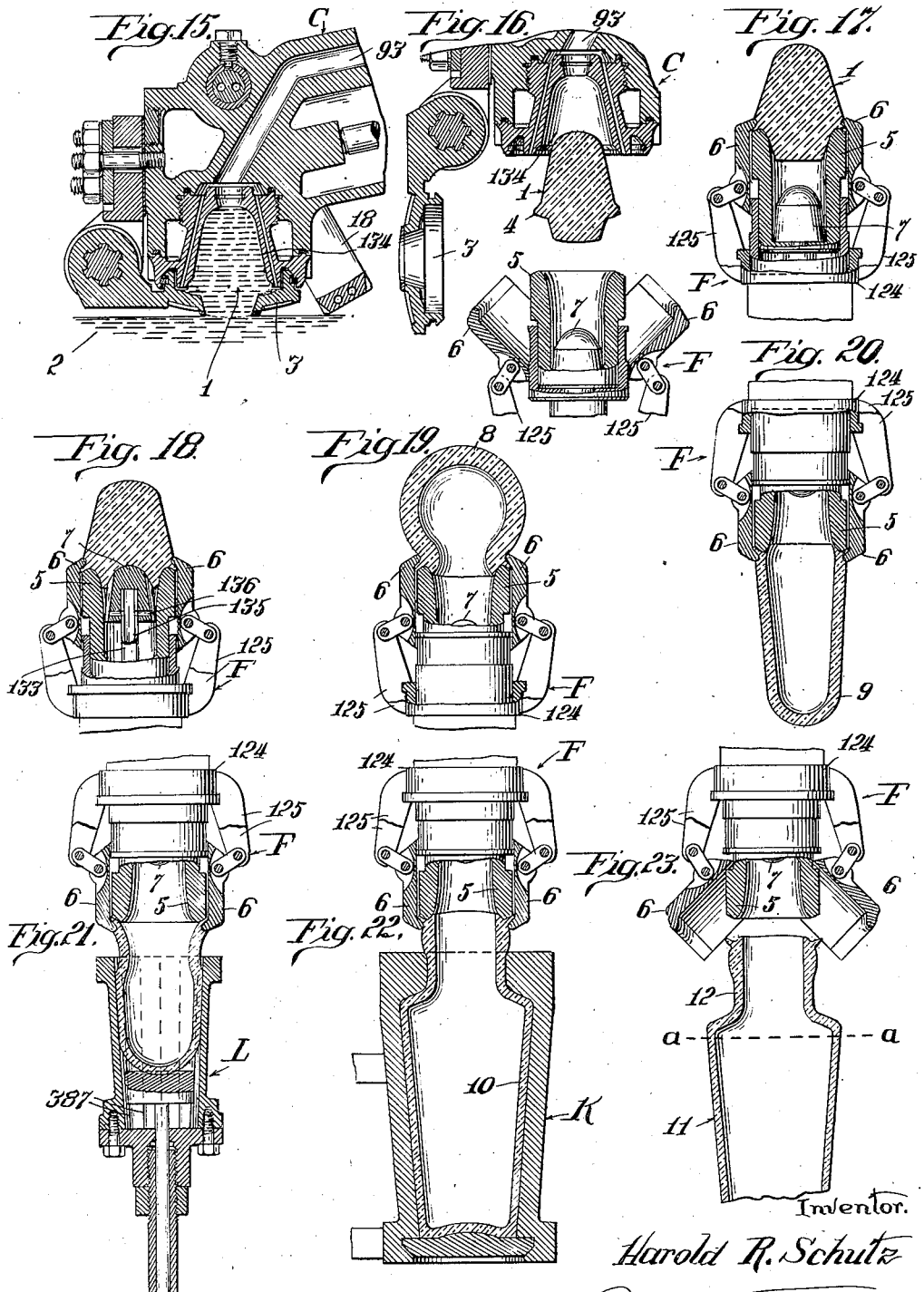

Feb. 11, 1936.  H. R. SCHUTZ  2,030,328
GLASS WORKING APPARATUS
Filed July 11, 1932   28 Sheets-Sheet 8
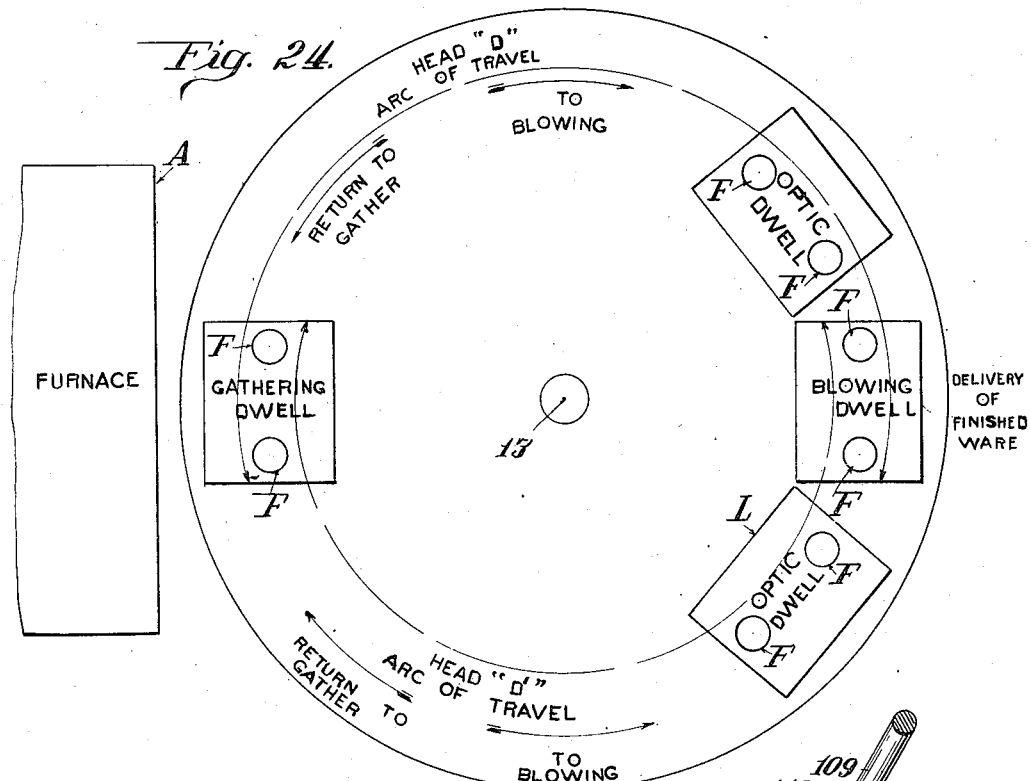
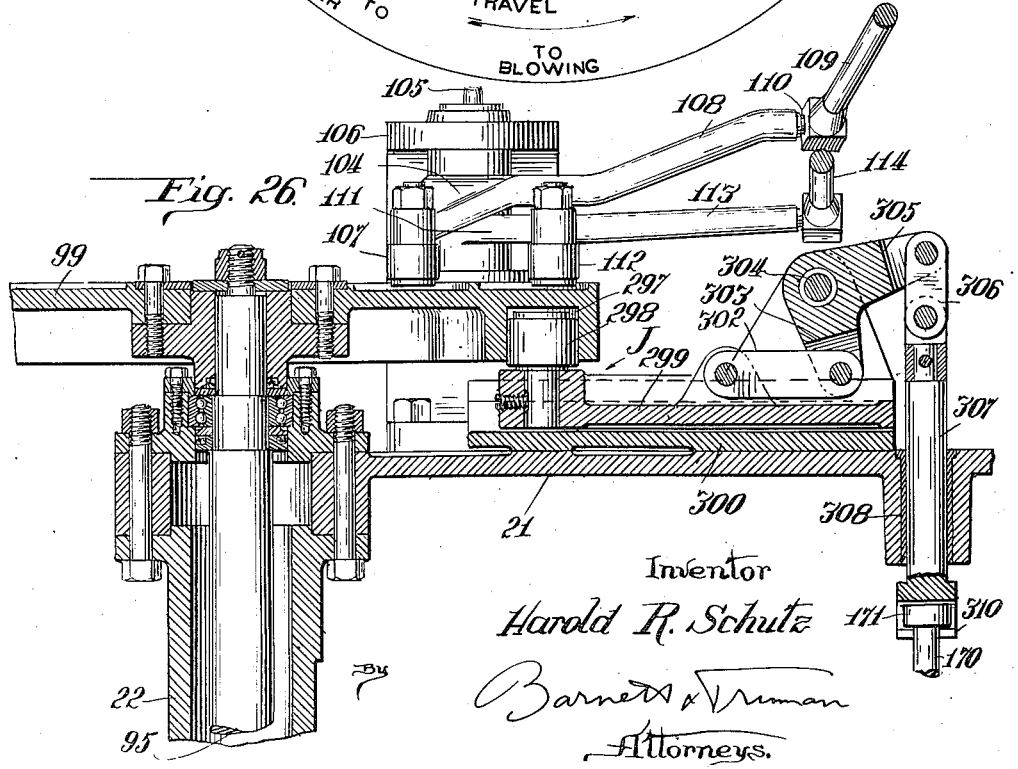
Inventor
Harold R. Schutz
Barnett & Truman
Attorneys.

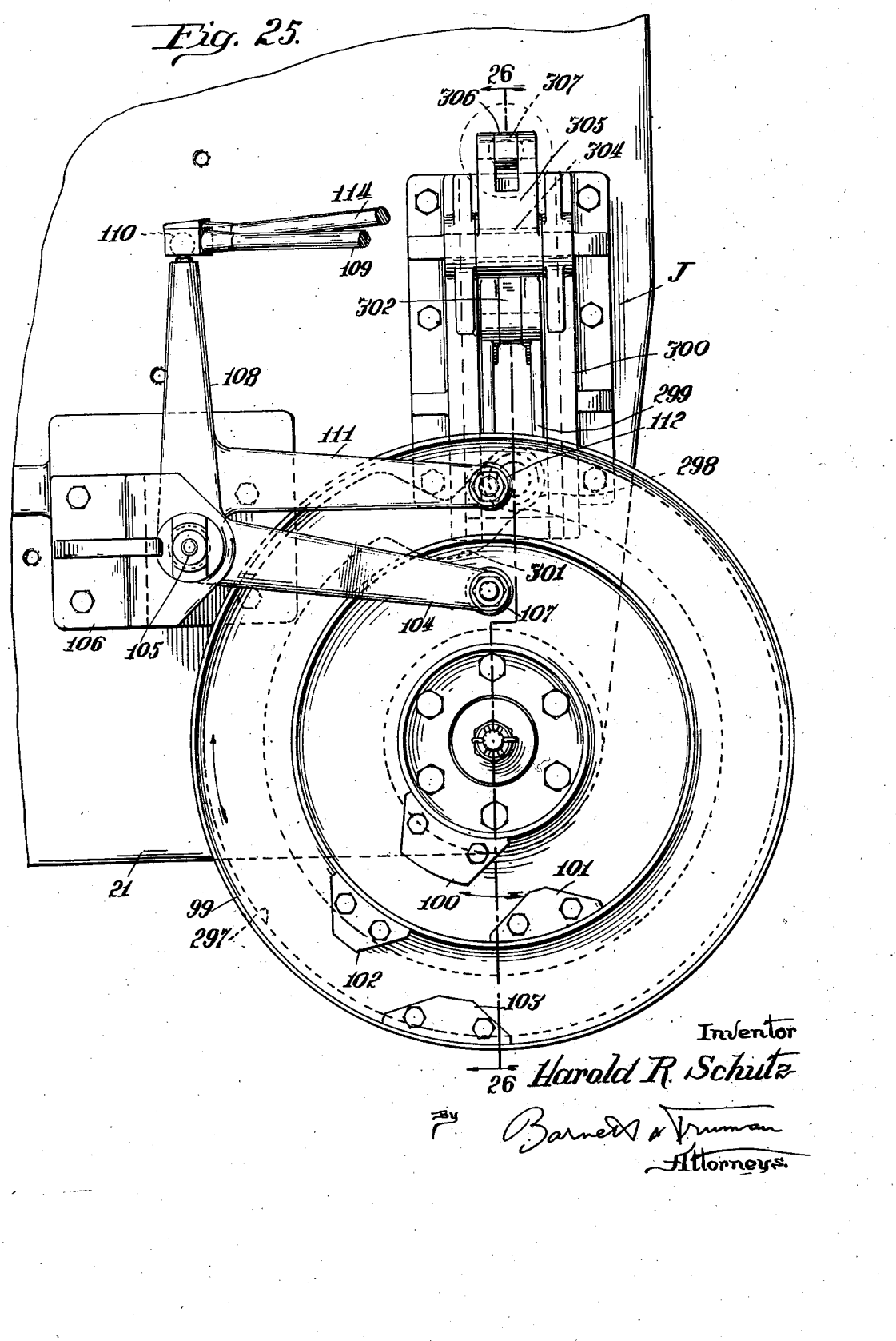

Feb. 11, 1936.  H. R. SCHUTZ  2,030,328
GLASS WORKING APPARATUS
Filed July 11, 1932  28 Sheets-Sheet 10
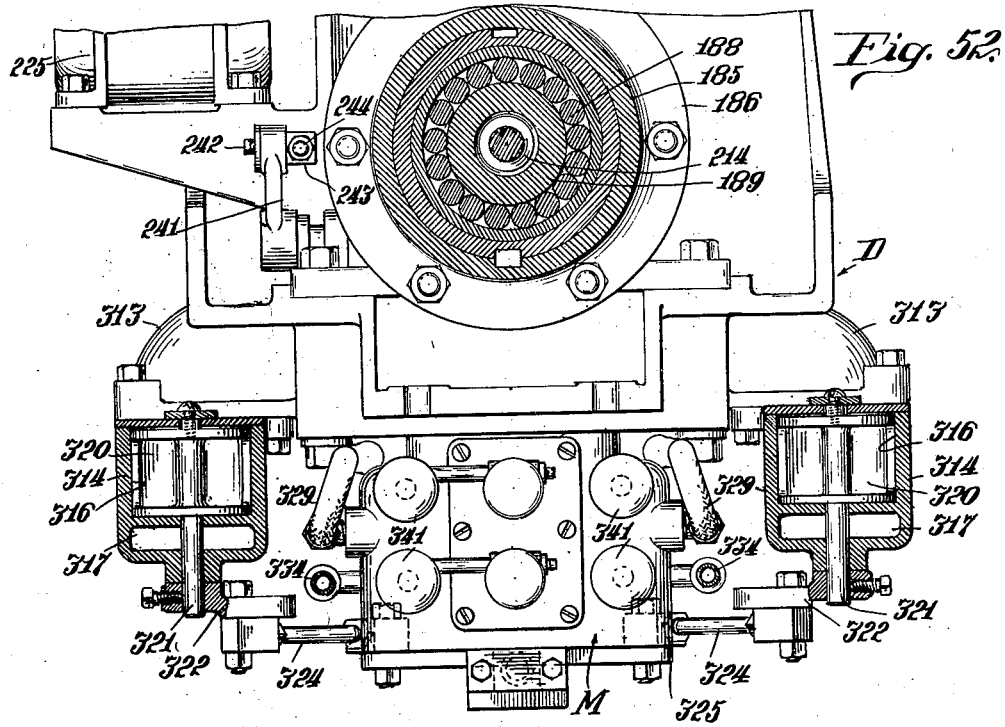
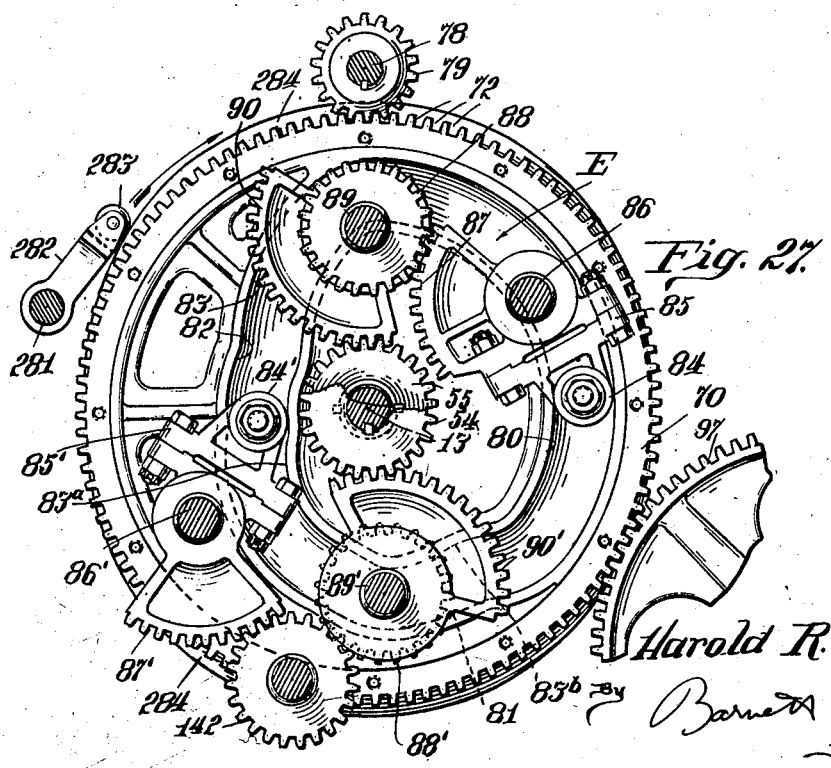
Inventor
Harold R. Schutz Feb. 11, 1936.  H. R. SCHUTZ  2,030,328
GLASS WORKING APPARATUS
Filed July 11, 1932  28 Sheets-Sheet 11
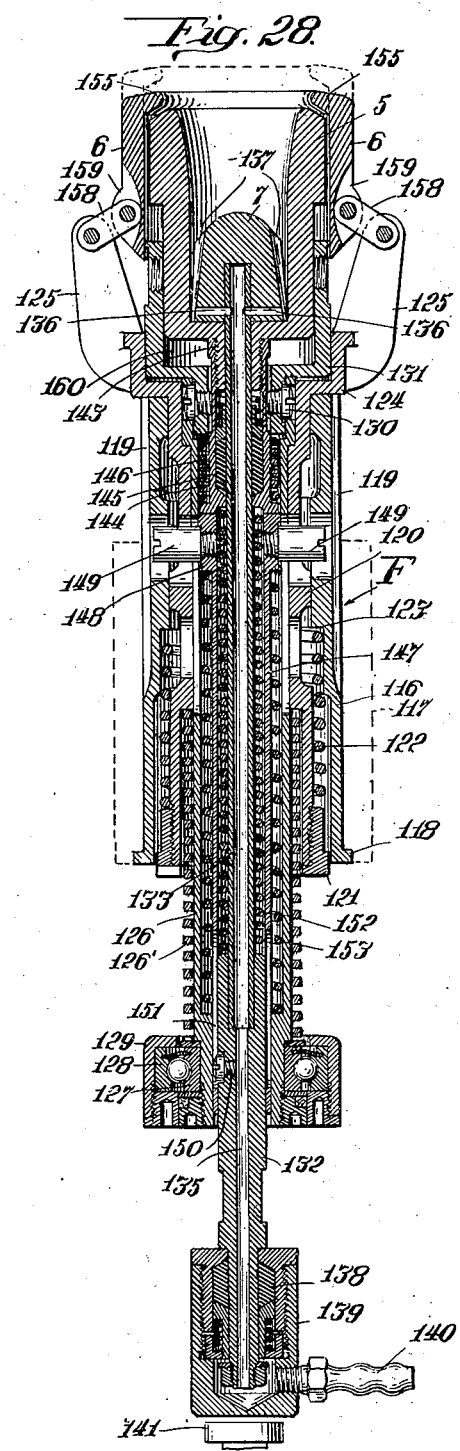
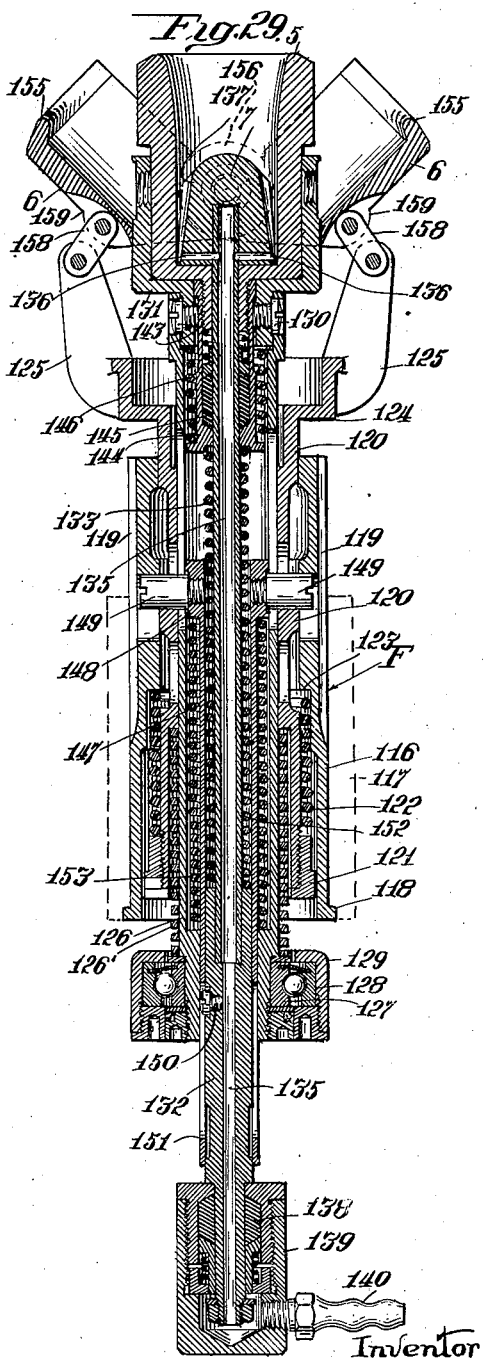
Inventor
Harold R. Schutz
Attorneys Feb. 11, 1936. H. R. SCHUTZ 2,030,328
GLASS WORKING APPARATUS
Filed July 11, 1932 28 Sheets-Sheet 12
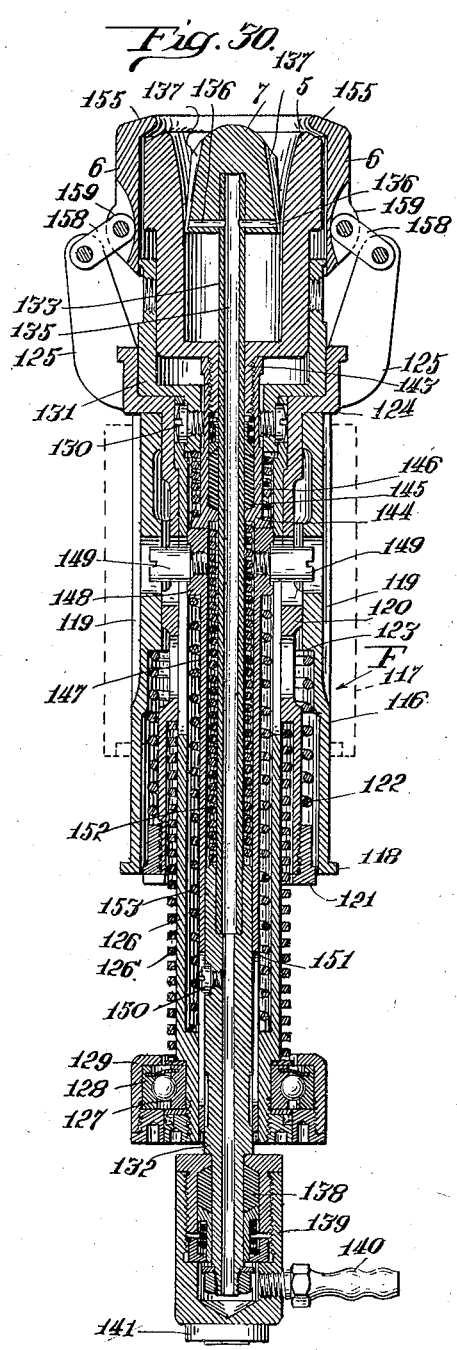
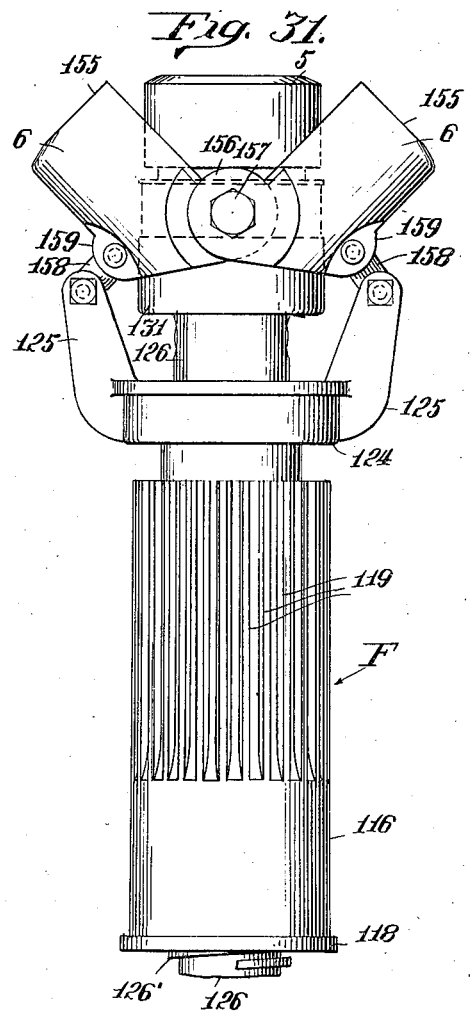
Inventor.
Harold R. Schutz
By Barnett & Truman
Attorneys.

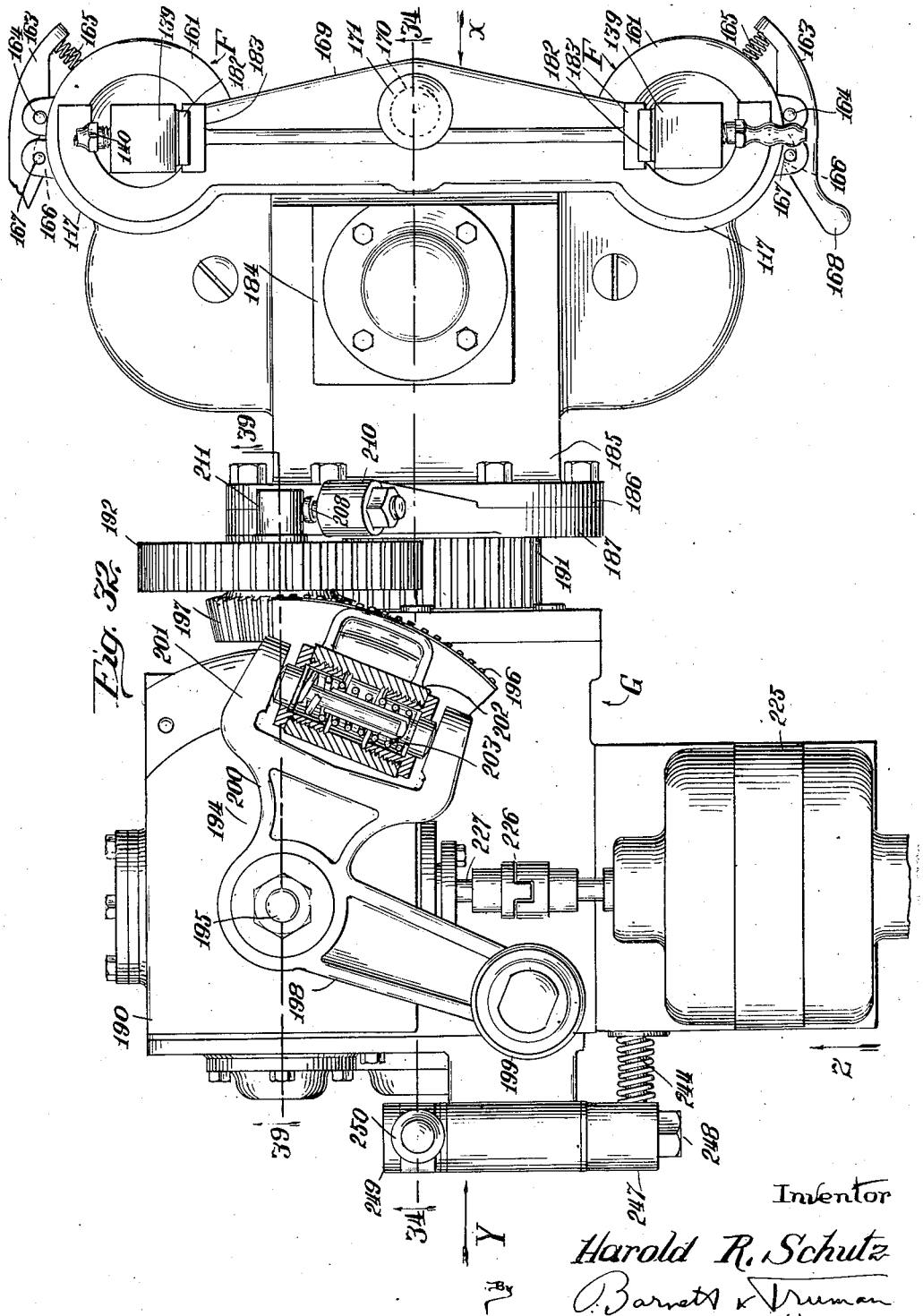

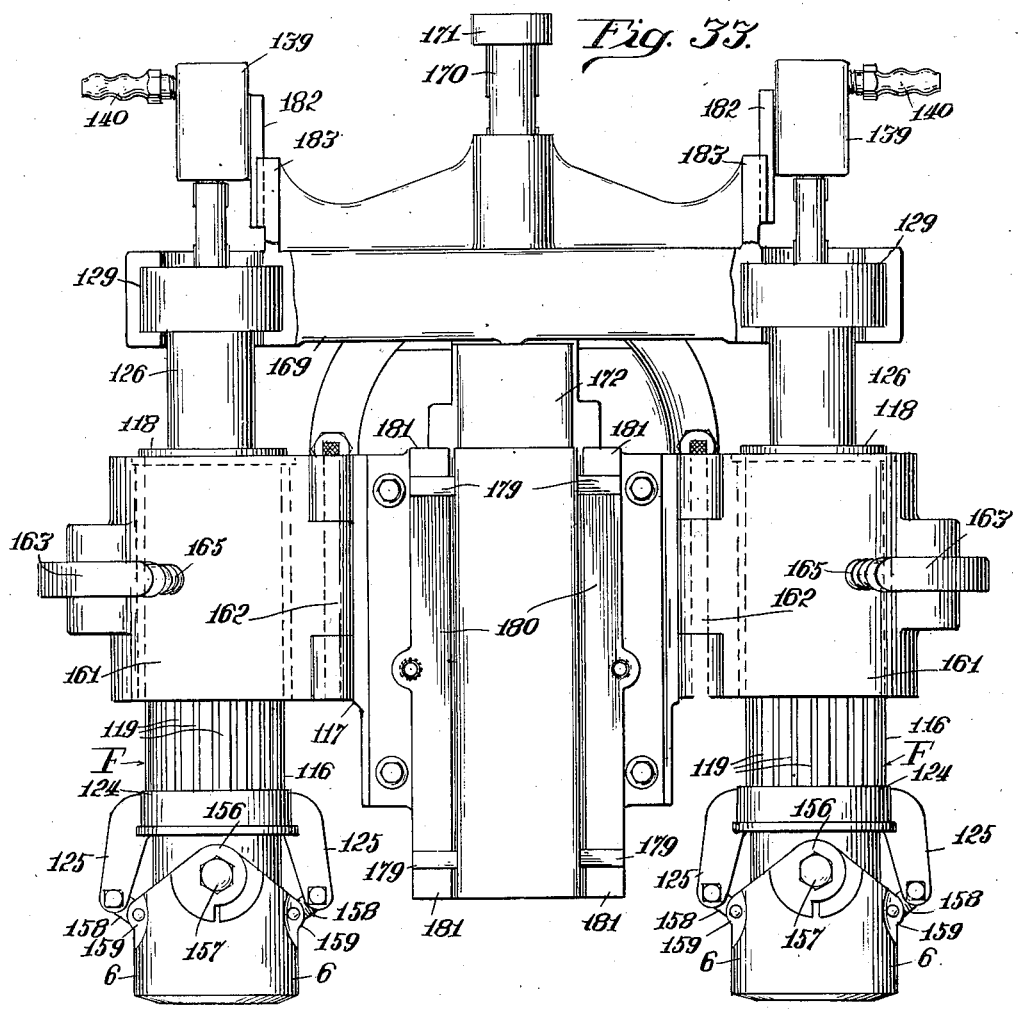

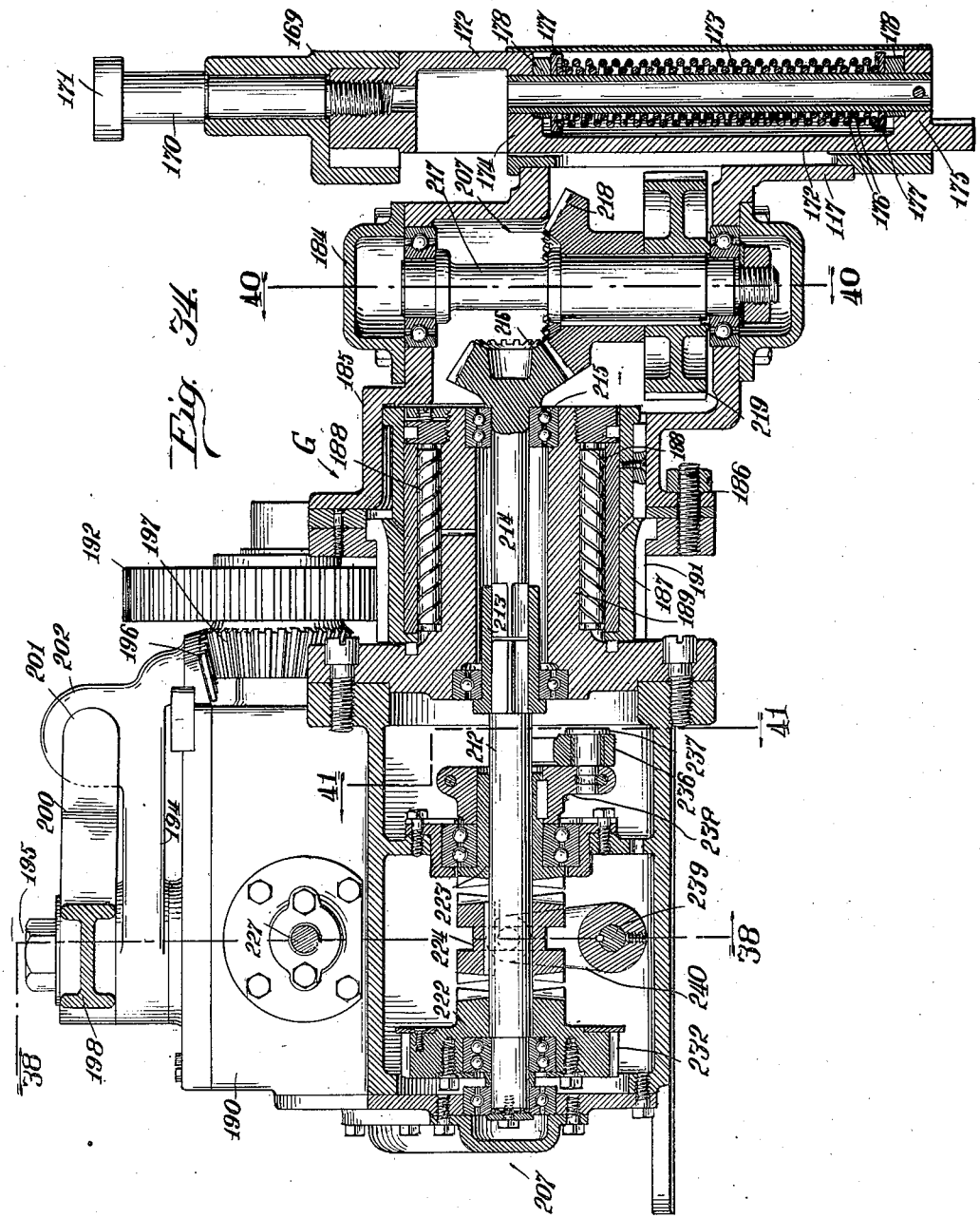

Feb. 11, 1936.                    H. R. SCHUTZ                    2,030,328
                              GLASS WORKING APPARATUS
                              Filed July 11, 1932          28 Sheets-Sheet 16
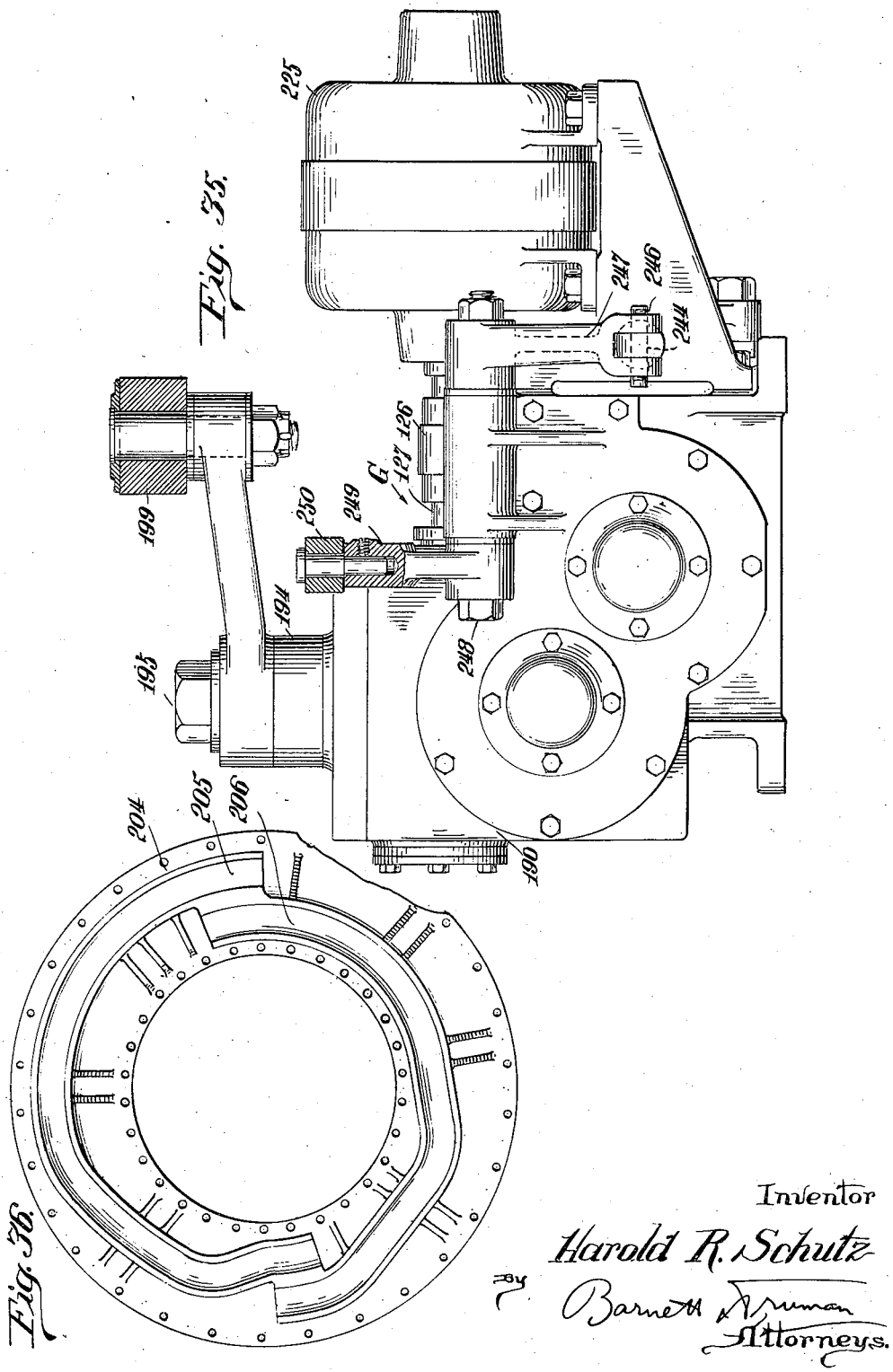
Inventor
Harold R. Schutz
By Barnett & Truman
Attorneys.

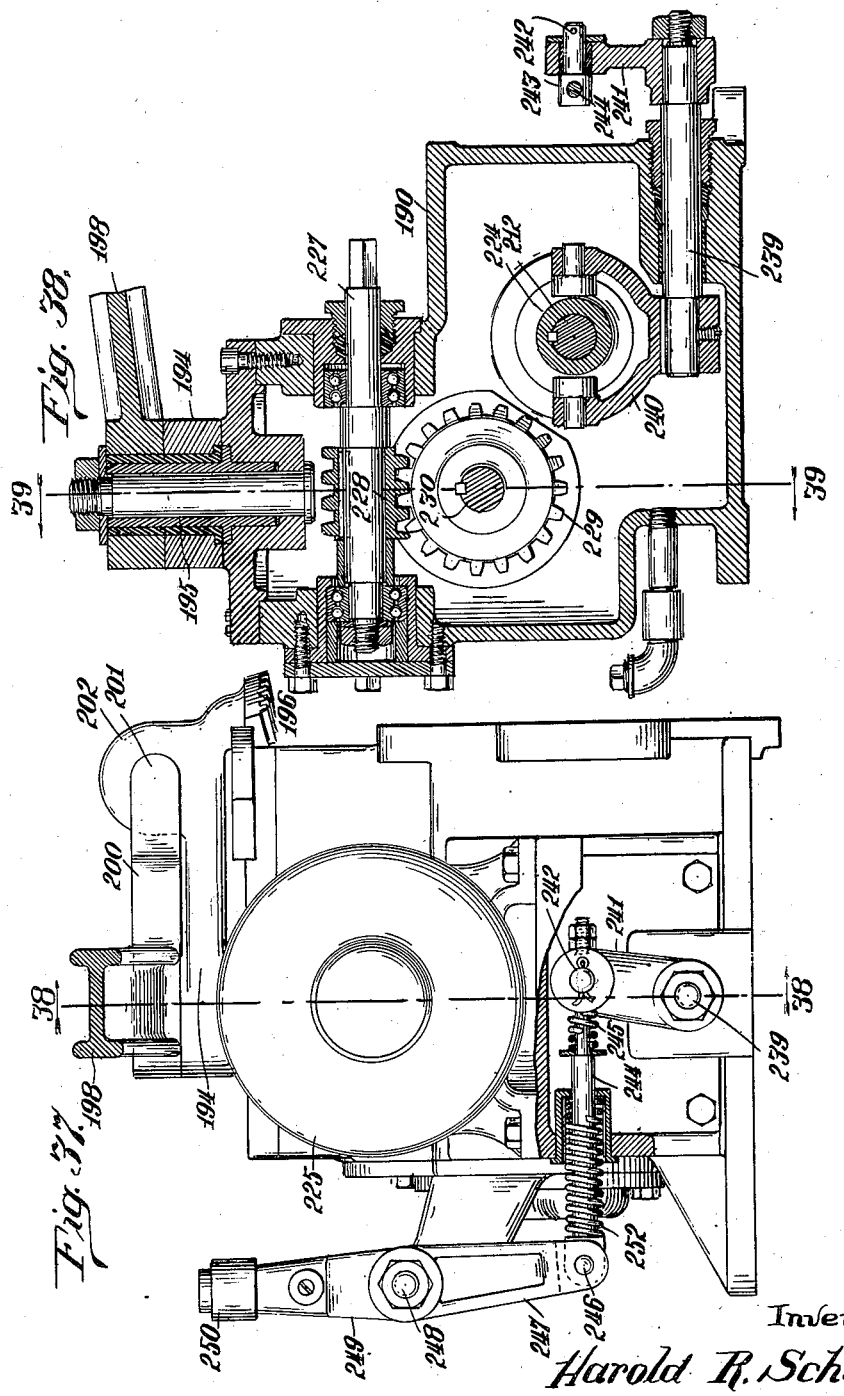

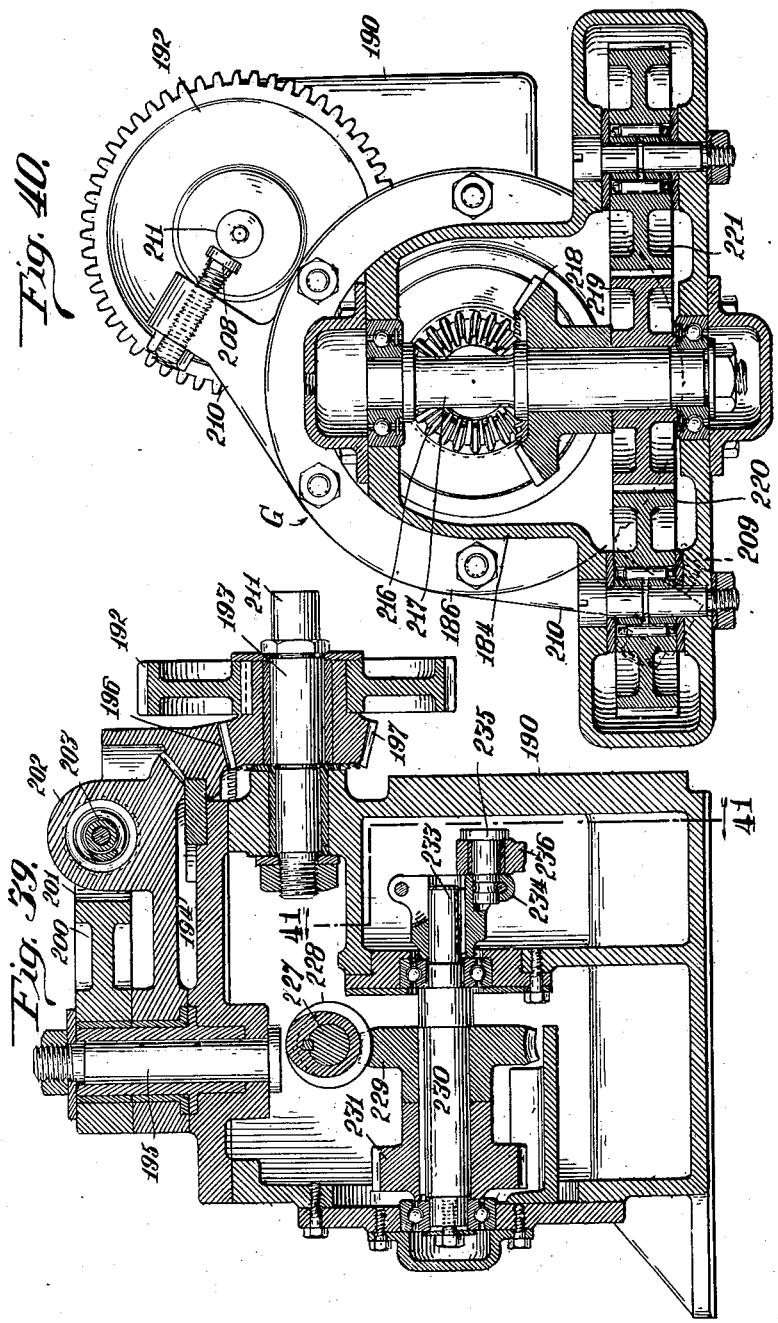

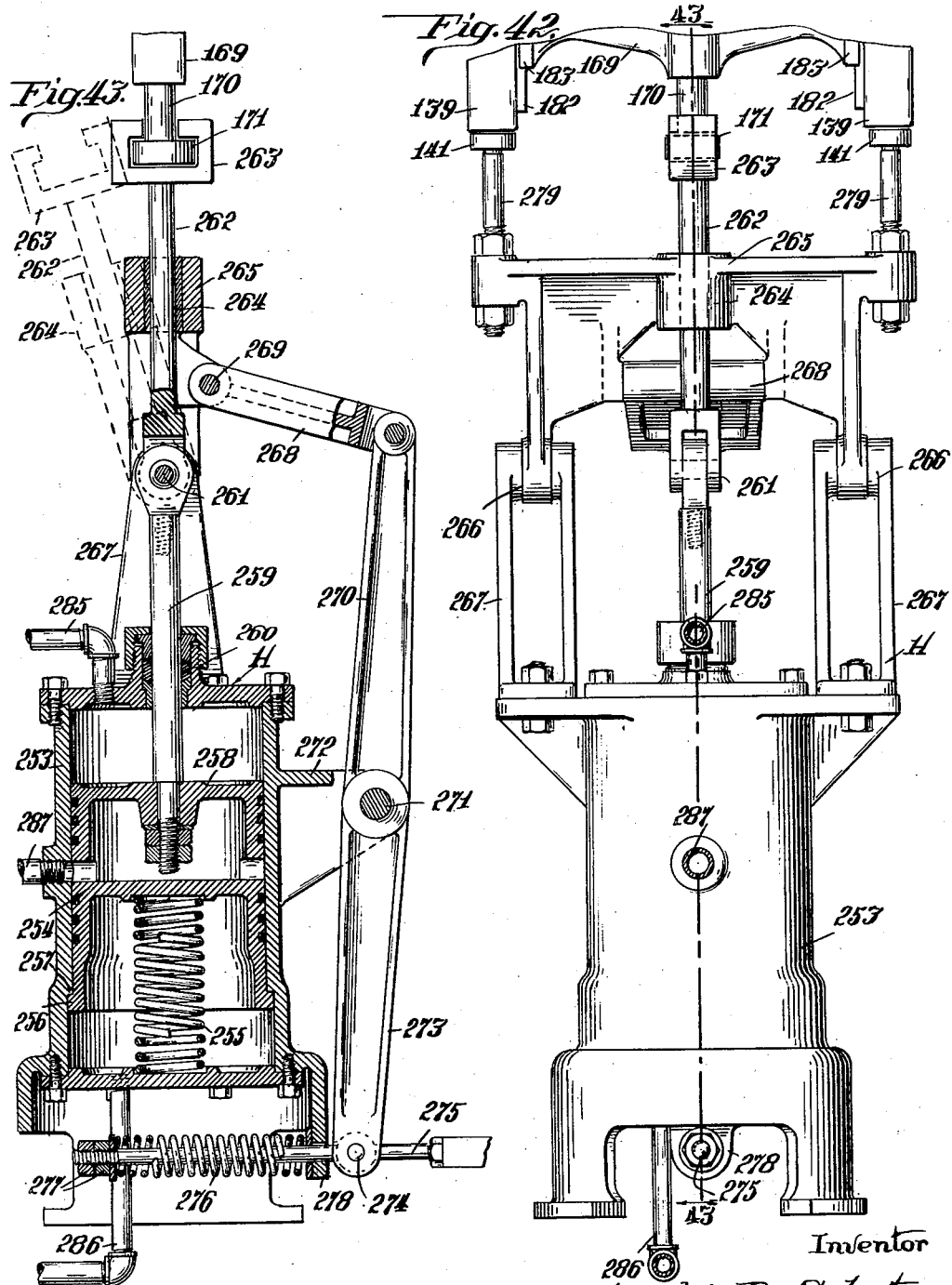

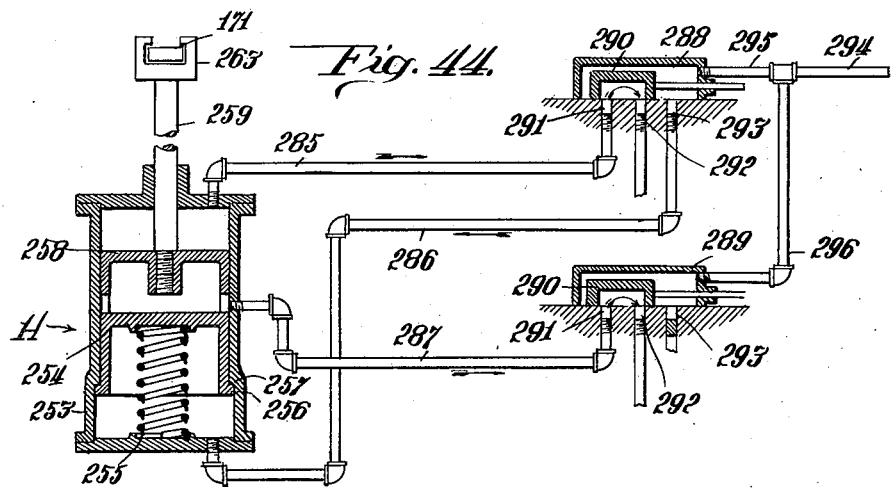
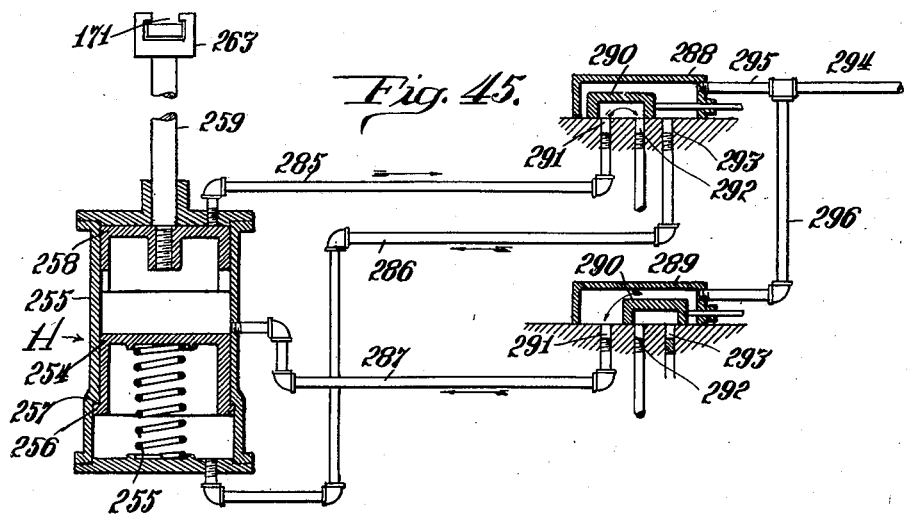
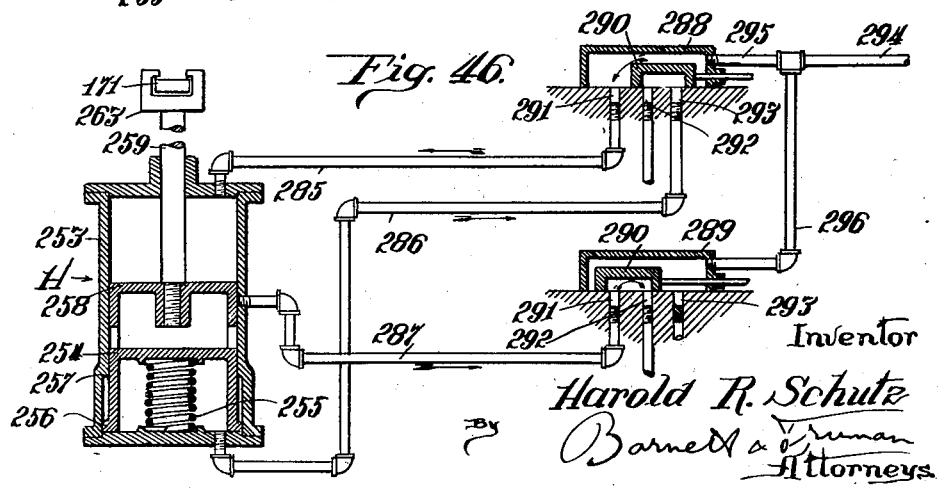

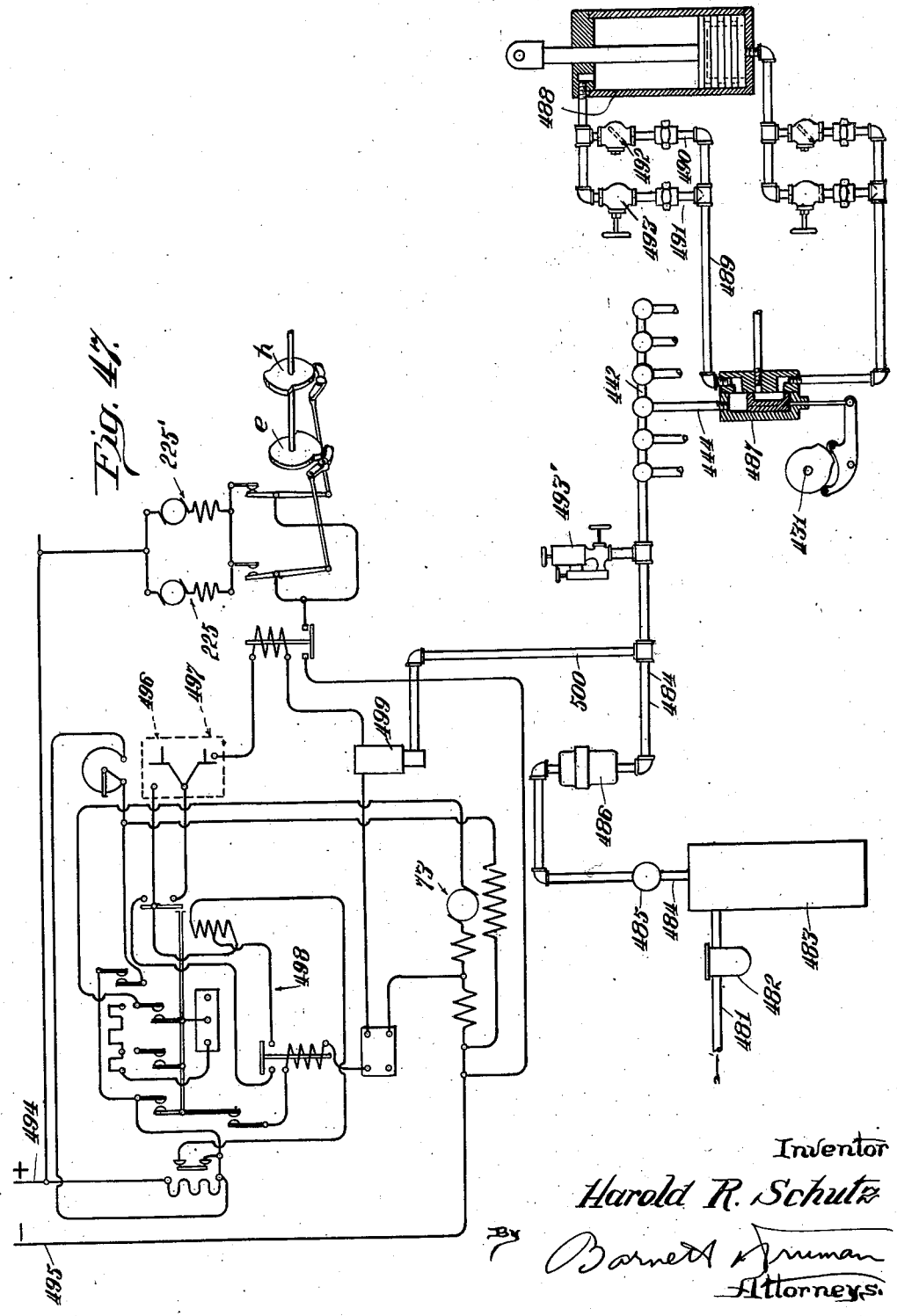

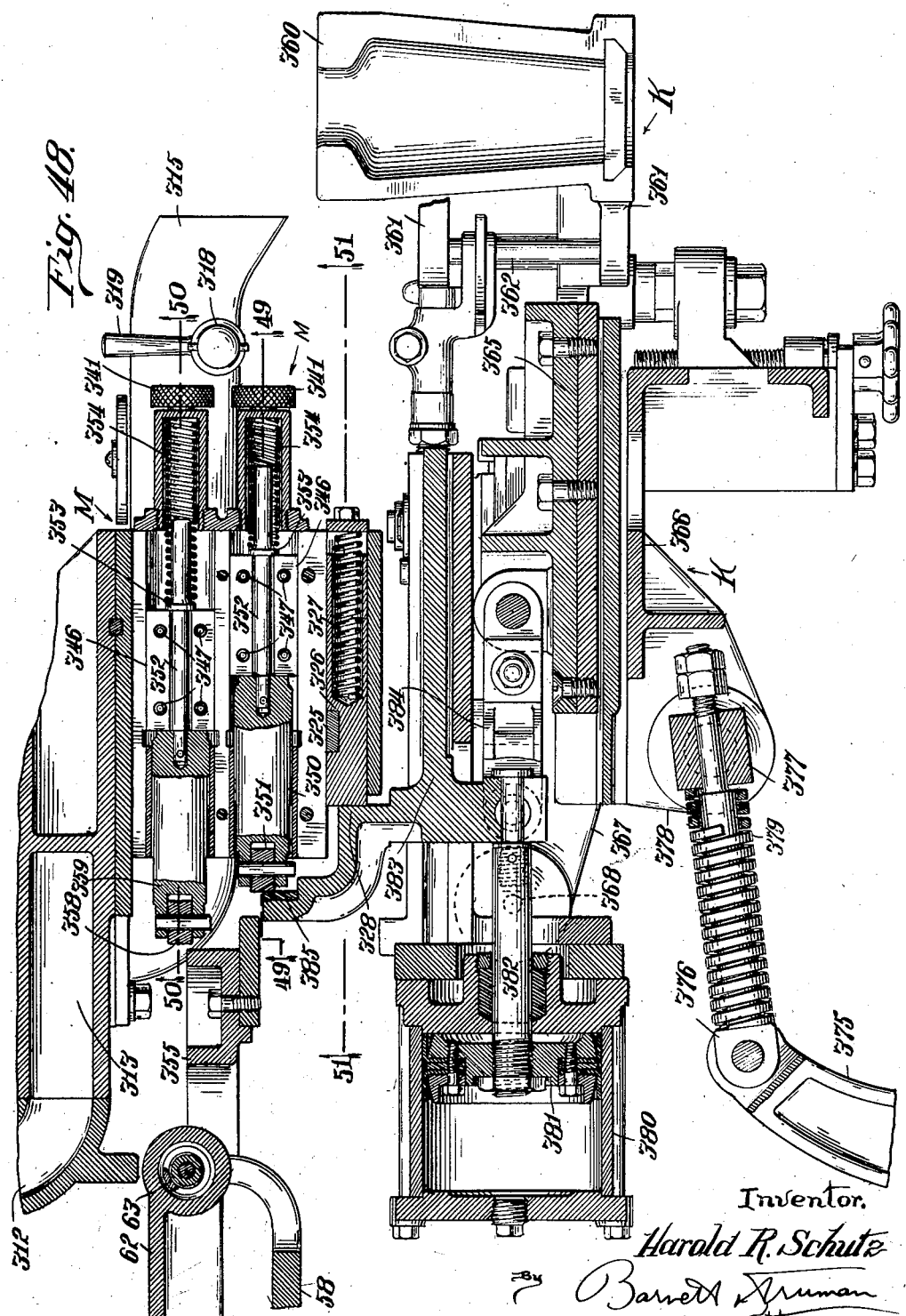

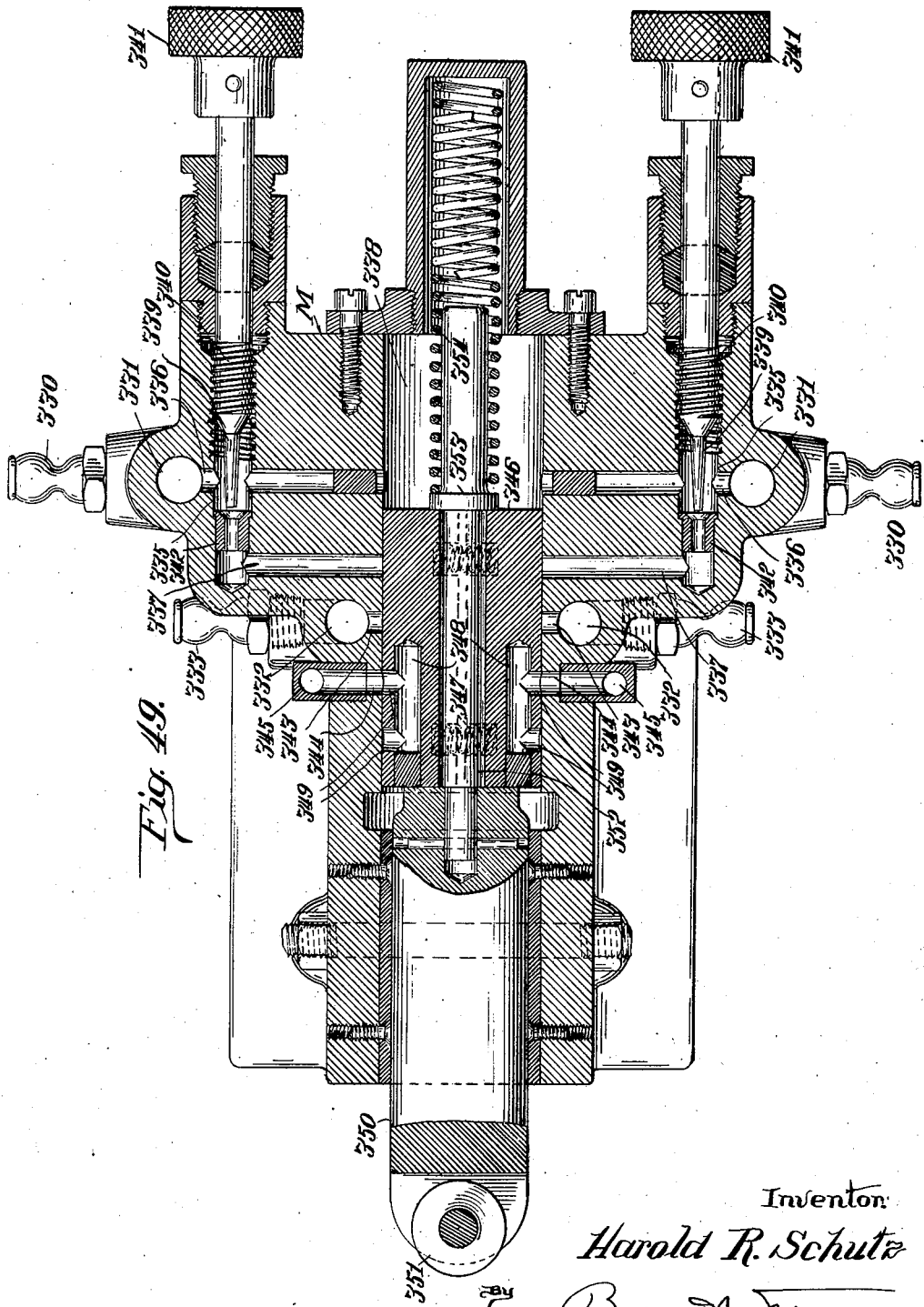

Feb. 11, 1936.  H. R. SCHUTZ  2,030,328
GLASS WORKING APPARATUS
Filed July 11, 1932  28 Sheets-Sheet 24
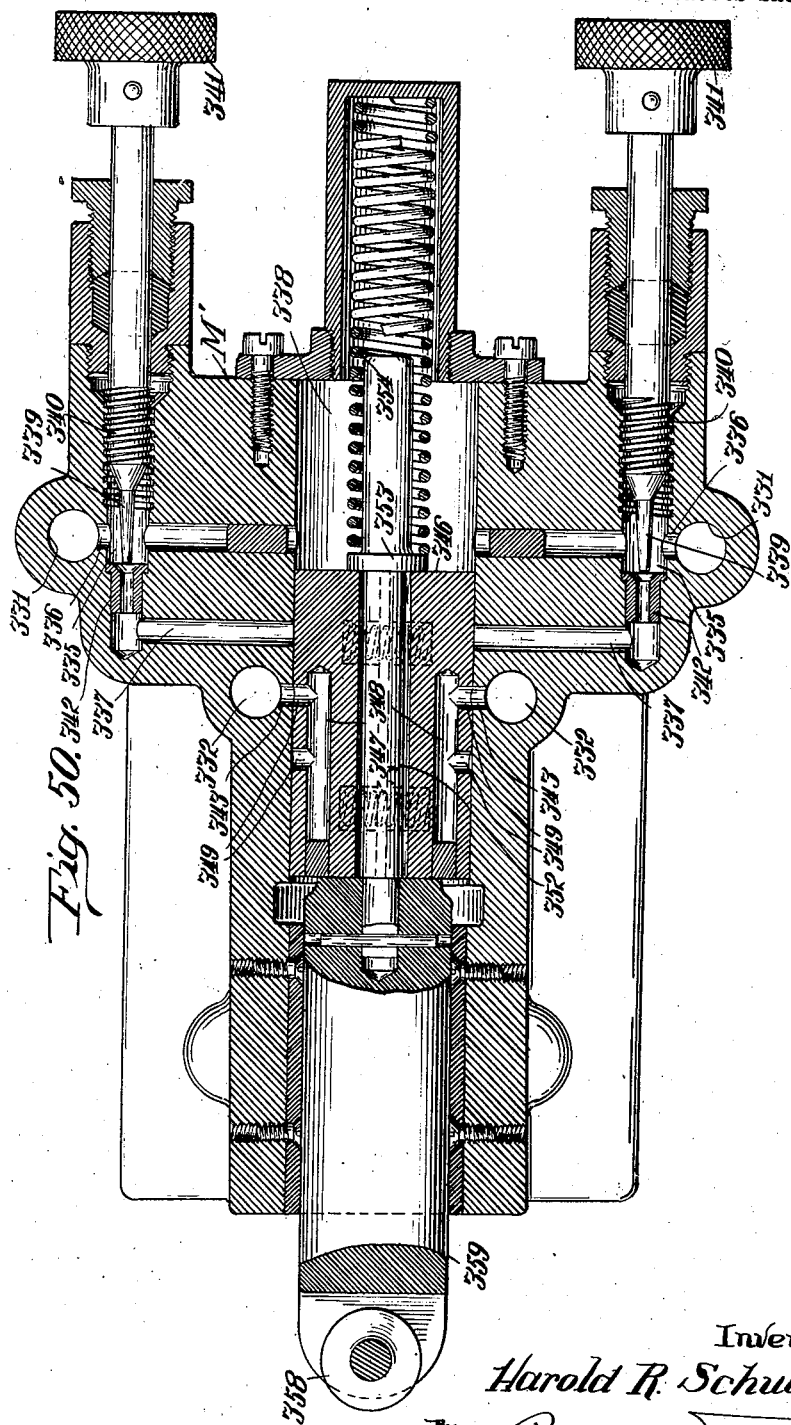
Inventor.
Harold R. Schutz
By Barnett & Truman
Attorneys.

Feb. 11, 1936. H. R. SCHUTZ 2,030,328
GLASS WORKING APPARATUS
Filed July 11, 1932 28 Sheets-Sheet 25
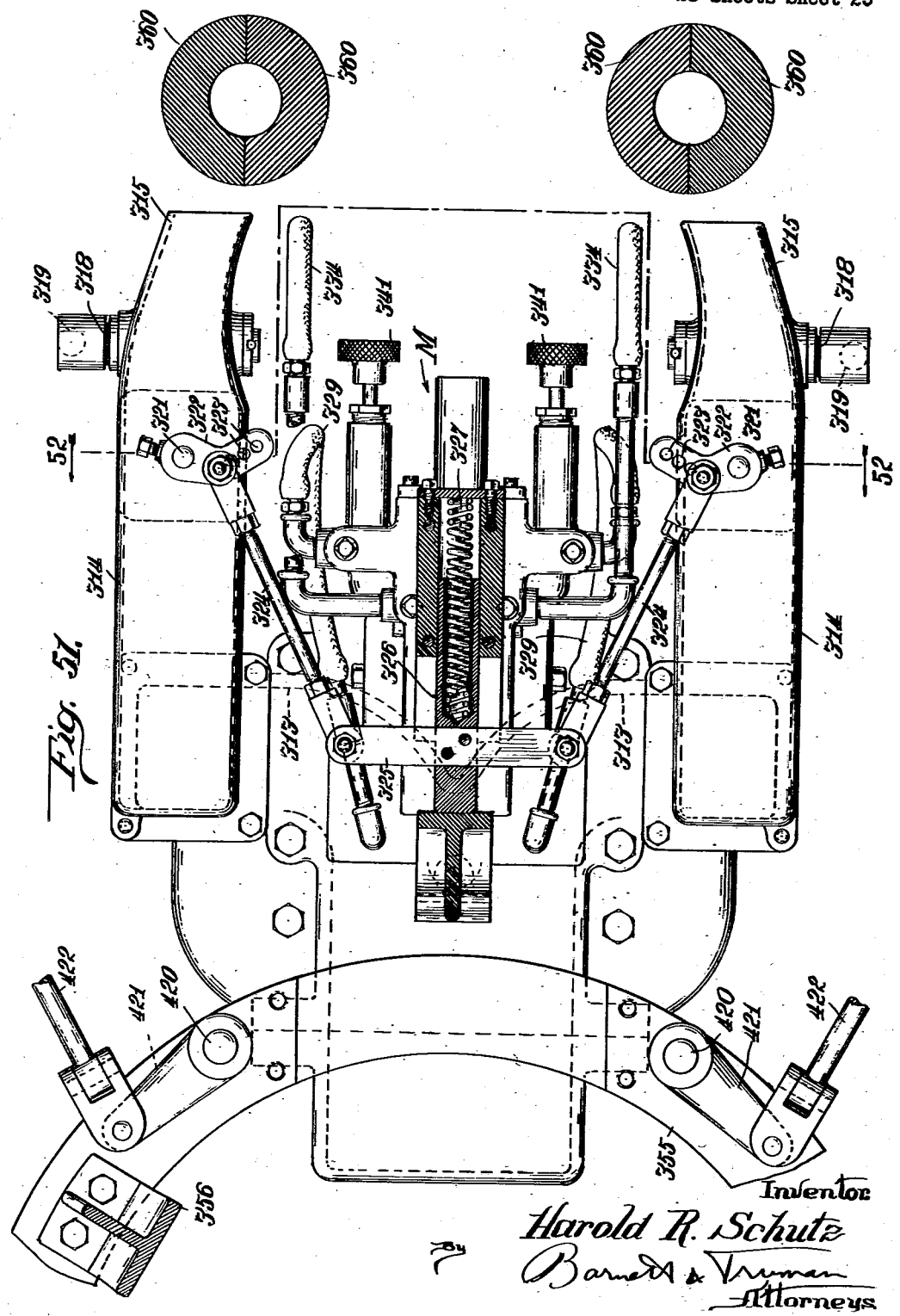
Inventor
Harold R. Schutz
Barnett & Truman
Attorneys

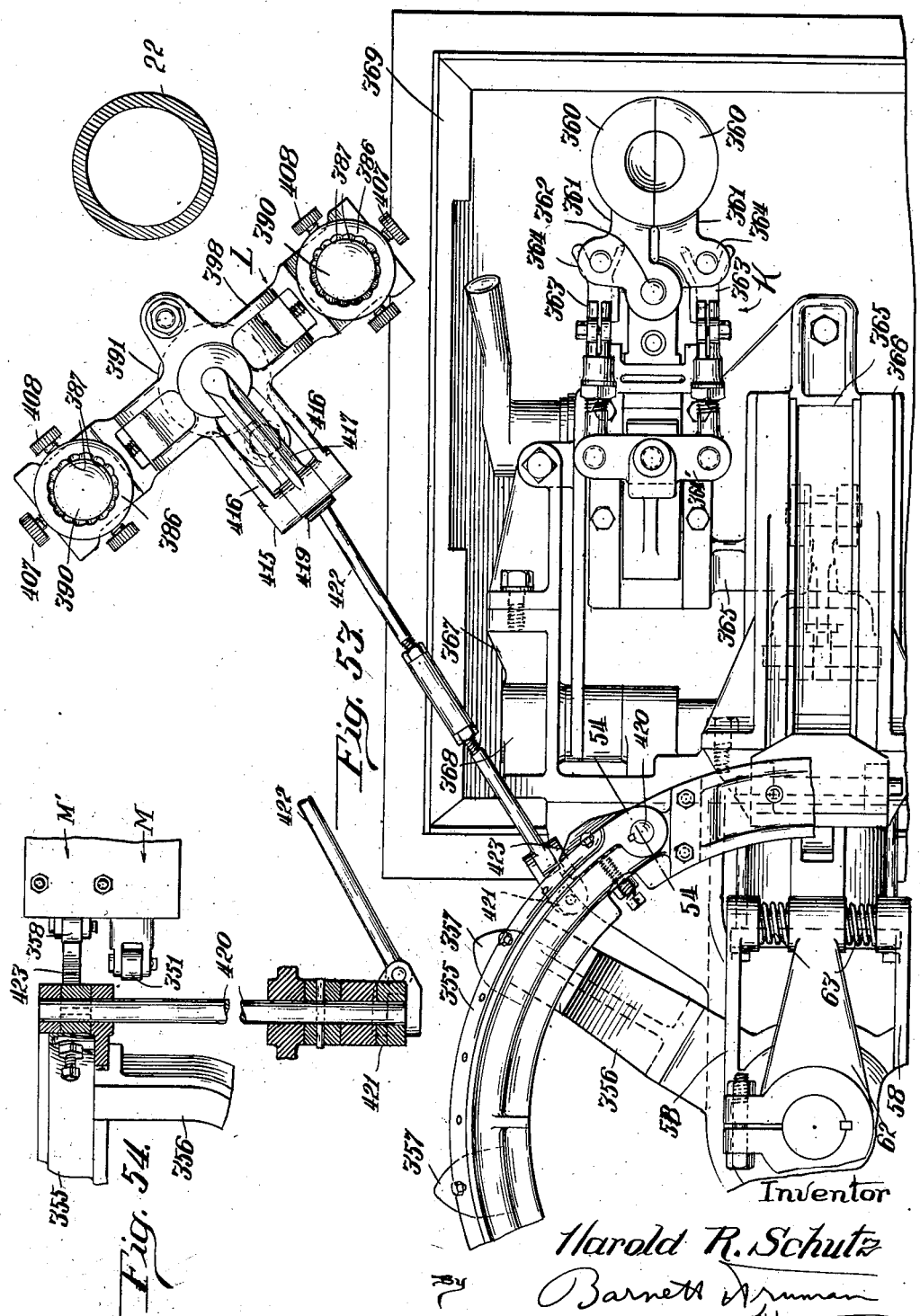

Feb. 11, 1936.  H. R. SCHUTZ  2,030,328
GLASS WORKING APPARATUS
Filed July 11, 1932  28 Sheets-Sheet 27
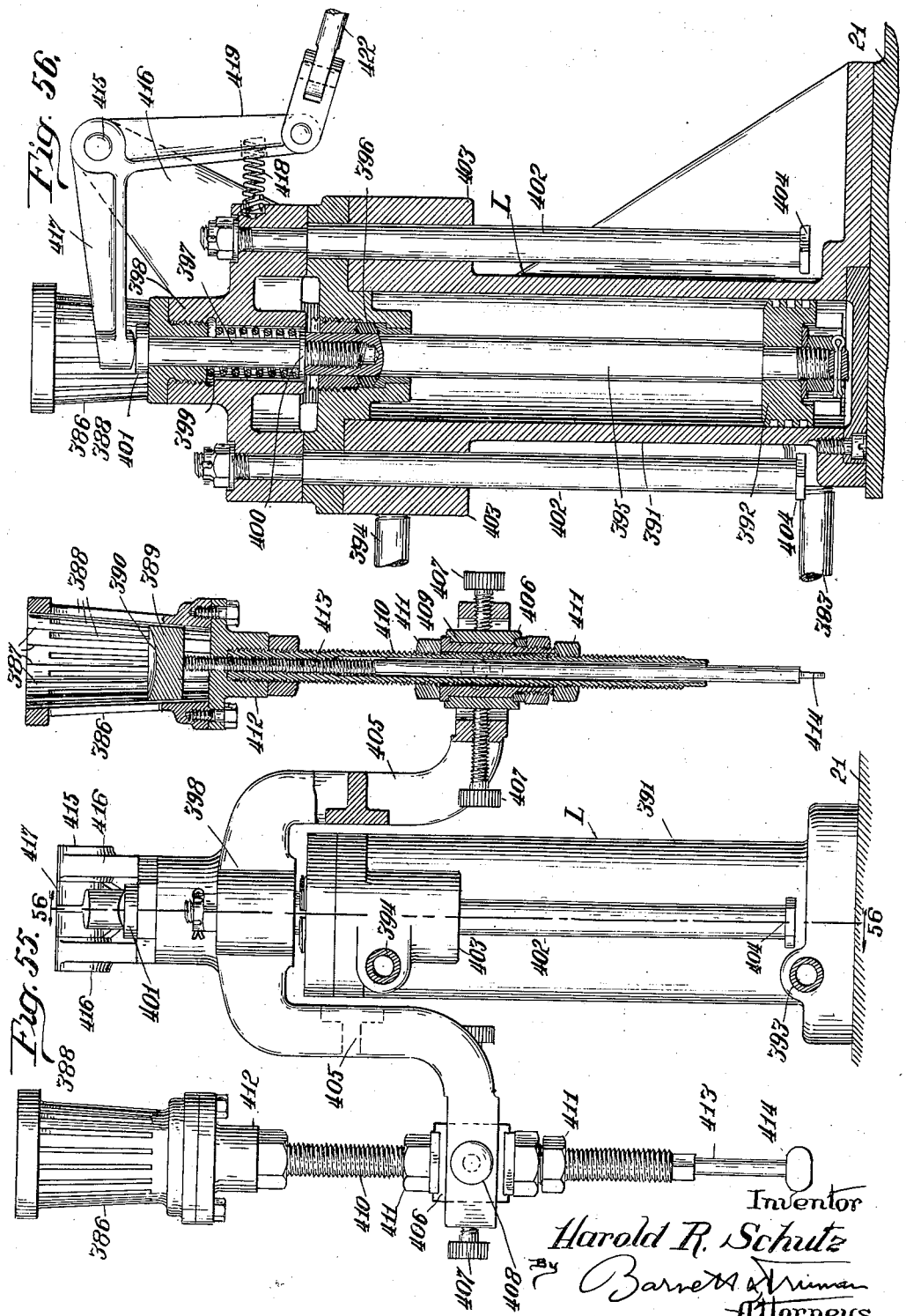

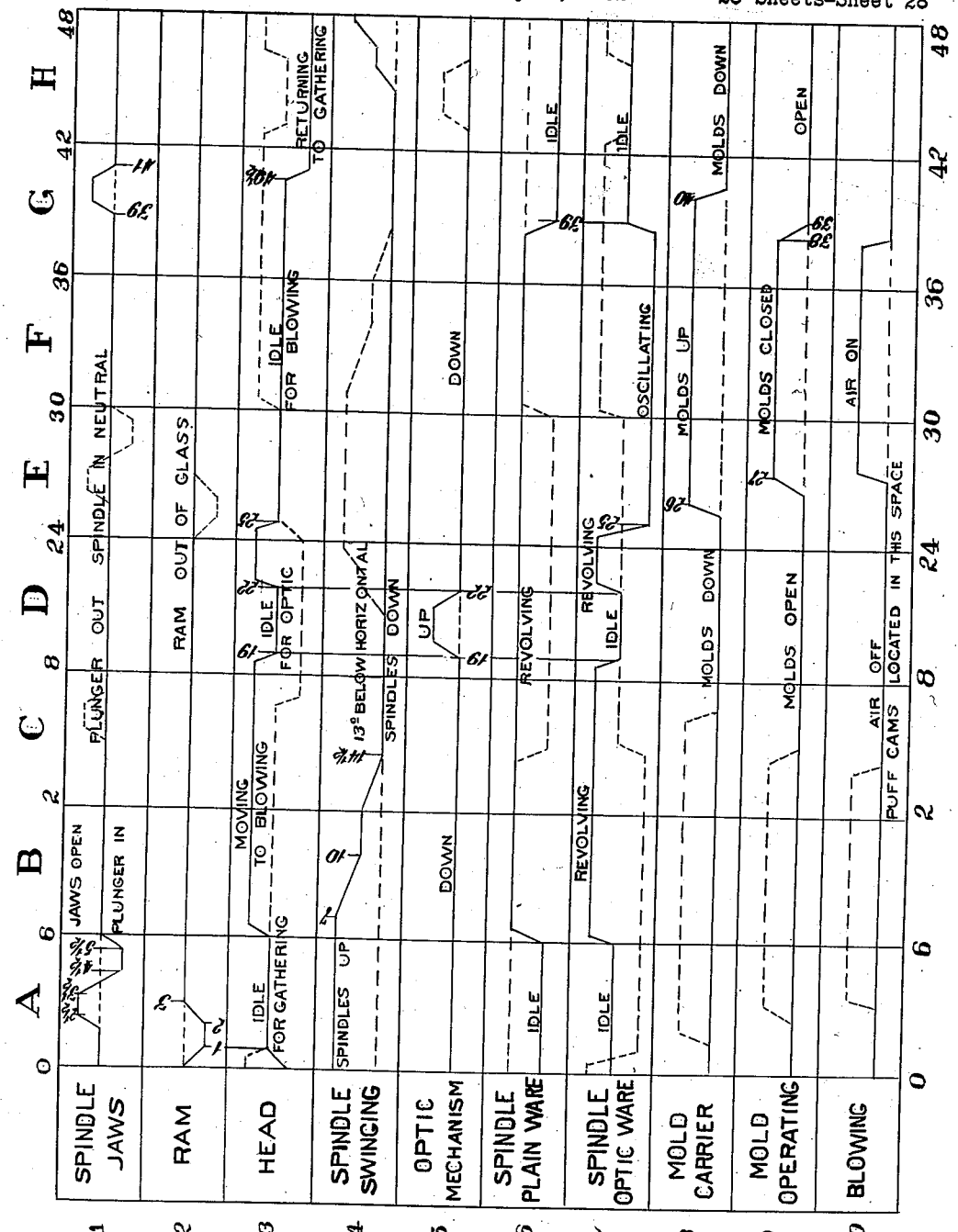

Patented Feb. 11, 1936

2,030,328

UNITED STATES PATENT OFFICE 2,030,328

GLASS WORKING APPARATUS

Harold R. Schutz, Ottawa Hills, Ohio, assignor to The Libbey Glass Manufacturing Company, Toledo, Ohio, a corporation of Ohio Application July 11, 1932, Serial No. 621,854

50 Claims. (Cl. 49—5)

This invention relates to a new and improved glass working apparatus, and more particularly to improvements in an apparatus of the type adapted to form hollow glass articles by a succession of steps comprising gathering a blank of molten glass from a furnace, shaping the blank by swinging and spinning operations and by blowing air into the hollow blank, and expanding the hollow blank by internal air pressure within a mold so as to give the desired shape to the hollow glass article. The particular machine hereinafter disclosed by way of example has been designed for making glass tumblers, but machines of this type may be adapted for making bottles, bulbs, or other hollow or partially hollow glass articles.

The best known type of machine designed for this purpose comprises a framework positioned adjacent a furnace and rotatable about a central vertical axis, the frame supporting a circular series of similar glass-working units which revolve continuously in a singular path about the vertical axis. Each glass-working unit is more or less complete in itself and comprises a spindle mechanism and a molding mechanism and cooperating parts whereby the glass and blank is formed by a series of steps which take place successively as the unit travels continuously through its circular path. When each glass-working unit is adjacent the furnace, a gathering mechanism withdraws a charge of molten glass from the furnace and delivers it to the spindle mechanism of the unit. In some machines there is a separate gathering mechanism for each glass-working unit, and in some a single gathering mechanism supplies the charges to each of the units successively. The finished glass article is delivered from each of the glass working units before it has completed its 360° path of travel so that the spindle can return into position to receive a new charge of molten glass after which the steps are repeated during the next rotation of the frame.

The machine forming the subject matter of the present invention is of a smaller and simplified type comprising two separate glass working units, the gathering and molding mechanisms being common to the two units. The machine comprises two similar independently movably spindle-carrying heads which swing about a central vertical axis between a gathering station positioned adjacent the furnace and a molding station positioned substantially 180° therefrom. In the example here shown the two heads oscillate back and forth through opposite arcs of substantially 180° each between the two stations.

A gathering mechanism positioned adjacent the furnace is adapted to successively deliver blanks of molten glass to the two spindle mechanisms as they come into position at the gathering station. A molding mechanism, permanently positioned at the molding station, is adapted to successively cooperate with the two spindle mechanisms as they come into position and dwell at the molding station. A single means is provided for independently swinging the two heads between the two stations with suitable dwells at each station. If desired, means may be provided for subjecting the glass blank to an intermediate glass-treating operation at a location intermediate the gathering and molding stations.

The general object of this invention is to provide an improved glass-working apparatus of the type briefly described hereinabove and disclosed more in detail in the specifications which follow.

Another object is to provide an improved glass-working machine comprising a plurality of independently movable spindle-heads movable between gathering and blowing stations, with appropriate dwells at each station.

Another object is to provide an improved raising, lowering and traversing mechanism for the assembled machine.

Another object is to provide an improved spindle-carrying head and head-moving mechanism.

Another object is to provide an improved spindle mechanism.

Another object is to provide improved spindle-rotating and oscillating mechanism.

Another object is to provide improved spindle-inverting mechanism.

Another object is to provide improved spindle-jaw and plunger operating mechanism.

Another object is to provide improved gathering-ram controlling mechanism.

Another object is to provide improved mold-operating mechanism.

Another object is to provide improved valve mechanism for controlling the blowing and cooling air.

Another object is to provide improved control valve and switch mechanisms for operating the several elements of the machine in properly timed relation.

Another object is to provide an improved "optic" mechanism for treating the partially formed glass blank.

Other objects and advantages of the invention will be more apparent from the following detailed description of certain approved forms of apparatus and devices especially designed for carrying out the principles of this invention.

In the accompany drawings:

Fig. 1 is a side elevation of the glass-working machine and a portion of the furnace, parts of both the machine and furnace being shown in central vertical section.

Fig. 2 is a horizontal section taken substantially on the line 2—2 of Fig. 1, with the molding apparatus omitted, and certain portions of the structure being broken away on a lower sectional plane.

Fig. 3 is a detail vertical section taken substantially on the line 3—3 of Fig. 2.

Fig. 4 is a detail vertical section, taken substantially on the line 4—4 of Figs. 2 and 7.

Fig. 5 is a transverse vertical section, taken substantially on the line 5—5 of Fig. 2.

Fig. 6 is a partial vertical section, taken substantially on the line 6—6 of Fig. 2.

Fig. 7 is an enlarged vertical section through the valve and switch operating assembly, the view being taken substantially on the line 7—7 of Fig. 2, with portions shown in elevation.

Fig. 8 is a transverse vertical section, taken substantially on the line 8—8 of Fig. 7.

Fig. 9 is a transverse vertical section looking from the opposite direction and taken substantially on the line 9—9 of Fig. 7.

Fig. 10 is a similar transverse vertical section taken substantially on the line 10—10 of Fig. 7.

Fig. 11 is a similar transverse vertical section taken substantially on the line 11—11 of Fig. 7.

Fig. 12 is a similar transverse vertical section taken substantially on the line 12—12 of Fig. 7.

Fig. 13 is a similar vertical section taken substantially on the line 13—13 of Fig. 7.

Fig. 14 is a detail perspective view of one of the slide valves.

Figs. 15 to 23 inclusive are a series of diagrammatic vertical sections illustrating successive steps in the formation of one of the hollow glass articles.

Fig. 24 is a diagram designed to illustrated the general operating movements of the two separate glass-working units.

Fig. 25 is an enlarged horizontal section, taken substantially on the line 25—25 of Fig. 1, showing in plan the control cam mechanism for the gathering ram.

Fig. 26 is a detail vertical section, taken substantially on the line 26—26 of Fig. 25, and showing the mechanism for opening the spindle jaws when the blowing operation has been completed.

Fig. 27 is a horizontal section taken substantially on the line 27—27 of Fig. 5, showing the main driving cam and head-swinging mechanism.

Fig. 28 is a central vertical section through one of the spindle mechanisms, when in normal or neutral position.

Fig. 29 is a similar view with the spindle jaws opened and the spindle elevated.

Fig. 30 is a view similar to Fig. 28 with the plunger elevated.

Fig. 31 is an elevation of one of the spindle mechanisms with the jaws opened as in Fig. 29.

Fig. 32 is an enlarged plan view of one of the spindle assemblies, consisting of a pair of similar spindles and the mechanism for inverting the spindles and alternatively rotating or oscillating the spindles.

Fig. 33 is a front elevation of one pair of spindles and the supporting mechanism therefor, this view being taken looking in the direction of the arrows x as shown on Figs. 1 and 32.

Fig. 34 is a longitudinal vertical section taken substantially on the line 34—34 of Fig. 32.

Fig. 35 is an end elevation looking at the spindle assembly from the left or in the direction of the arrow y as seen in Fig. 32.

Fig. 36 is an inverted plan view of the spindle-inverting cam, this view being taken looking substantially from the line 36—36 of Fig. 1 in the direction of the arrows.

Fig. 37 is a side elevation of a portion of the spindle-operating assembly, the view being taken looking substantially in the direction of the arrow z of Fig. 32.

Fig. 38 is a vertical section, taken substantially on the line 38—38 of Fig. 37 or 34.

Fig. 39 is a vertical section taken substantially on the line 39—39 of Fig. 38 or 32.

Fig. 40 is a vertical section taken substantially on the line 40—40 of Fig. 34.

Fig. 41 is a detail vertical section showing the oscillating mechanism, the view being taken substantially on the line 41—41 of Figs. 34 and 39.

Fig. 42 is an elevation of the mechanism positioned at the gathering station for operating the spindle jaws and plunger.

Fig. 43 is a central vertical section, taken substantially on the line 43—43 of Fig. 42.

Figs. 44, 45 and 46 are similar diagrammatic sectional views through the operating cylinder and valves to illustrate the operation of the device shown in Figs. 42 and 43. Fig. 44 shows the mechanism in neutral position, Fig. 45 in the position for elevating the spindle and opening the jaws, and Fig. 46 in spindle-plunger-operating position.

Fig. 47 is a wiring diagram, also showing a schematic arrangement of a portion of the air-pressure system.

Fig. 48 is an enlarged vertical section through the mold assembly and air-control valves, the view being similar to that shown at the right of Fig. 1.

Fig. 49 is a horizontal section through one set of "blow" valves, the view being taken substantially on the line 49—49 of Fig. 48.

Fig. 50 is a similar section through one set of "puff" valves, the view being taken substantially on the line 50—50 of Fig. 48.

Fig. 51 is an inverted horizontal section taken substantially on the line 51—51 of Fig. 48 looking upwardly in the direction of the arrows.

Fig. 52 is a vertical section taken substantially on the line 52—52 of Fig. 51. (This figure will be found on the same sheet with Fig. 27.)

Fig. 53 is a horizontal section taken substantially on the line 53—53 of Fig. 1, and showing one of the "optic" mechanisms in plan.

Fig. 54 is a detail vertical section taken substantially on the line 54—54 of Fig. 53.

Fig. 55 is an elevation of one of the "optic" mechanisms, with one of the molds shown in vertical section.

Fig. 56 is a vertical section taken substantially on the line 56—56 of Fig. 55.

Fig. 57 is a timing chart illustrating the relative positions of the various parts of the mechanism at different time intervals throughout one complete cycle of operations.

Briefly described the apparatus comprises a suitable furnace A from which the molten glass is obtained; a supporting frame for the machine parts indicated generally at B; a gathering ram C for withdrawing the charges of molten glass from the furnace A; a pair of similar swinging heads D and D'; main driving mechanism indicated generally at E for swinging the heads in properly timed relation to one another; a plurality of similar spindles F, there being four of these spindles in the mechanism here shown, one pair on each head; similar mechanisms G and G' for rotating, oscillating and inverting the spindles; a mechanism H at the gathering station for operating the spindle jaws and plungers; a mechanism J at the blowing or molding station for opening the spindle jaws to discharge the finished ware; a mold assembly indicated generally at K; a pair of similar "optic" mechanisms L and L', one for treating the blanks carried by each pair of spindles; air control valves M and M'; and the assembly of control cams driven from the main driving mechanism E and indicated generally at N.

Before describing the various parts of the apparatus in detail, the general principles of operation of the machine will be briefly referred to. In Figs. 15 to 23 inclusive is indicated a series of successive steps in the formation of one of the glass articles, the process here illustrated not differing materially from the process as heretofore performed by means of already known machines. As shown in Fig. 15, the head of the gathering ram C has been inserted into the furnace and a charge of molten glass 1 has been sucked up into the head from the mass of molten glass 2 within the furnace. In the next step as shown in Fig. 16 the ram has been withdrawn from the furnace and the closure 3 of the gathering ram has been opened to discharge the blank 1, a puff of air under pressure usually being employed to assist in discharging the blank from the gathering mechanism. The blank 1 has been formed with an annular flange portion 4 and is of such consistency at this stage in the cooling process that it will retain this general form as it drops into engagement with the spindle F. The spindle F is formed with a cup 5 adapted to receive the blank and with jaws 6 which are closed over the flange 4 to hold the blank in place. This position of the spindle is shown in Fig. 17. In Fig. 18 the plunger 7 within the spindle F has been elevated with relation to the remainder of the spindle mechanism so as to form an opening in the center of the blank 1. As shown in Fig. 19 a puff of air has been delivered into the opening formed by plunger 7 and has slightly expanded the blank in hollow form as shown at 8. In Fig. 20 the spindle F has been inverted so that the blank will be suspended or hang downwardly. The movements given to the spindle F combined with the force of gravity acting on the blank itself has served to elongate the hollow blank into approximately the form indicated at 9. In Fig. 21 the "optic" mechanism L has been elevated into engagement with the partially formed blank 9. The purpose of this treatment is to partially chill certain lines or sections of the blank to cause unequal thicknesses in spaced portions of the finished article. This process will be described more in detail hereinafter and may sometimes be omitted. In Fig. 22 the mold mechanism K has been raised and closed about the partially expanded blank. The blank is continually rotated or oscillated within the mold and air is admitted through the spindle F so as to expand the blank into the final form indicated at 10. In Fig. 23 the mold mechanism K has been removed and the jaws 6 of the spindle have been opened to discharge the finished article. In the example here shown the upper portion of this article is cut away along substantially the line indicated at a—a so as to form a glass tumbler 11, the upper portion 12 being discarded and used as cullet.

The general arrangement and operation of the present machine is indicated diagrammatically in Fig. 24. The two heads D and D' are adapted to swing back and forth through opposite arcs of 180°, about a common center 13, from a gathering station positioned adjacent the furnace to a blowing or molding station positioned at the opposite side of the machine. Each head carries its own glass-working unit consisting of a pair of spindles F and a mechanism G for imparting the desired movements to the spindles. It might be well to state at this point that the principles of operation of this machine would be the same if each head carried only a single spindle F instead of a pair of similar spindles. Both spindles are operated simultaneously and in the same manner by means of the single mechanism G. In the same manner, the gathering mechanism C comprises a pair of similar gathering heads, and the "optic" mechanisms and the finishing mold mechanism each comprise a pair of similar molds. In this manner the capacity of the machine is doubled, but the principles of operation of the machine are the same as if a single glass article was formed by each glass working unit during any one working cycle. A single operating mechanism E actuates the two heads D and D' so that they move independently but in properly timed relation to one another. The head D dwells at the gathering station for a sufficient length of time to receive the glass blanks from the gathering mechanism C. It then swings in a clockwise direction (as seen in Fig. 24) to the intermediate station where the "optic" mechanism is located where it dwells for a sufficient length of time to permit the treatment of the blank by this optic mechanism. The head then moves to the blowing or molding station where it dwells while the molds are moved up into position, the blowing of the blank is completed, the molds are removed, and the glass article discharged from the spindles. The head D then swings continuously back in a counter clockwise direction to the gathering station where a new cycle is started. In an exactly similar manner the head D' dwells at the gathering station to receive the glass blanks and then swings first in a counter clockwise direction to the blowing station, with an intermediate dwell at the optic station. It then returns to the gathering station by swinging in a clockwise direction. As will be apparent from the timing chart shown in Fig. 57 (which will be referred to hereinafter) the greater portion of the time taken for any one cycle is used in moving from the gathering station to the blowing station, and the dwells at these stations, the head returning very quickly from the blowing station to the gathering station. However, the movements are so timed that only one of the heads D and D' will be at any one station at the same time. It will be noted that a single gathering mechanism C and a single finishing mold mechanism K are employed, these mechanisms each being located permanently at their respective stations and cooperating successively with the parts carried by the two heads D and D'. This is also true of many of the auxiliary mechanisms, and in this manner the machine is considerably simplified as compared with the larger continuously rotating machines heretofore in use. The general features of the machine having been thus briefly described, the several elements of the apparatus will now be described in more detail.

The furnace

The furnace A may be of conventional type and forms no part of the present improvement. The furnace has a working opening 14, leading into the boot 16 which has portions 16' projecting downwardly beneath the surface of the molten glass 2 so as to partially segregate a pool of glass 17 from which the heads 15 suck the charges or blanks of glass. The usual shearing knife 18 carried adjacent each head 15 shears off the excess glass which falls into the pool 17.

The frame, raising, lowering, and traversing mechanism

The main supporting frame B comprises a lower platform 19 formed with a central casing portion 20 in which the larger part of the driving mechanism E is housed, an upper platform 21 supported from lower platform 19 by four hollow cylindrical corner posts 22, and a central tubular standard 23 which carries the bearing for the main central driving shaft. The frame also comprises a number of auxiliary arms, brackets, etc. which will be referred to as the description progresses. A pair of similar horizontal shafts 24 and 25 extend transversely through the lower portion of the frame B adjacent two opposite ends thereof and are journaled in bearings 26 formed in the side walls 27 of the framework. Reduced journals 28 extend eccentrically from the respective ends of each shaft and on these journals are rotatably mounted wheels 29 which support the machine upon the parallel rails 30 which extend perpendicularly to the wall of furnace A formed with the working opening 14. Worm wheels 31 are keyed on each of the shafts 24 and 25, and an operating shaft 32 extending through the frame at right angles to the shafts 24 and 25 is provided with worms 33 which mesh with the worm wheels 31. The shaft 32 is provided with a projecting non-circular end portion 34, at the end remote from the furnace, to be engaged by an operating crank whereby the shaft 32 may be rotated thus simultaneously rotating the two shafts 24 and 25. Since the journals 28 are positioned eccentrically on the ends of the shafts 24 and 25, it will be apparent that the framework and all of the machine parts carried thereby will be raised and lowered with respect to the supporting wheels 29 and tracks 30 as the shafts 24 and 25 are rotated so as to bring the eccentric journals 28 toward the upper or lower portions of the shafts respectively. In this manner the machine may be adjusted vertically into proper relation to the glass level in furnace A. Supporting plates 35 are journaled at 36 on the eccentrics 28 of shaft 24, inside of the wheels 29, and are formed with bearings for a transverse shaft 37 which extends through the machine parallel with shaft 24 and projects through slots 38 in the side frame 27. Pinions 39 secured on the respective ends of shaft 37 mesh with gear teeth 40 formed on the inner flanges of wheels 29. Pins 41 secured in the side frame 27 project through slots 42 formed in the plates 35, thus holding the plates against rotary movement while permitting them to move longitudinally of the frame B as the eccentrics 28 are rotated about the central axis of shaft 24. At the same time the supporting frames 35 will cause the shaft 37 to move longitudinally of the frame in unison with the eccentrics 28 thus keeping the pinions 39 and gears 40 in proper mesh. A worm wheel 43 is keyed on shaft 37, and a second operating shaft 44 which extends through the machine parallel to shaft 32 is provided with a worm 45 meshing with worm wheel 43. By engaging an operating crank with the non-circular projecting end 46 of shaft 44 the shafts 44 and 37 may be rotated to rotate one pair of wheels 29 and thus move the machine along the rails 30 toward or from the furnace.

Heads and head moving mechanism

A vertical tubular drive shaft 47 is journaled within the central frame standard 23 by means of an upper roller bearing 48 and a lower roller bearing 49. A central drive shaft 50 is journaled within the tubular shaft 47, there being a thrust bearing 51 for supporting the lower reduced end portion 52 of shaft 50 within the bottom frame member 53. Similar driving gears 54 and 55 are secured one above the other to the lower portions of the shafts 47 and 50 respectively. (See Figs. 1, 2, 5, 6 and 27.) A frame member 56 secured centrally of the upper platform 21 is provided with a tubular journal 57 projecting downwardly and centered about the vertical axis 13. The head D has a lower supporting arm 58 journaled freely on an upper portion of tubular shaft 47, and an upper arm 59 journaled on the downwardly extending member 57 beneath the frame member 56. Similarly the head D' has a lower arm 60 and an upper arm 61 journaled on tubular shaft 47 and journal 57 respectively beneath the arms 58 and 59 of head D. A crank arm 62 is secured to the upper end portion cf shaft 50, and a shock-absorbing connection 63 (Fig. 53) is interposed between the outer end of this crank arm and a yoked portion of arm 58 of the head D. A crank arm 64 secured on the tubular shaft 47 is connected through a similar shock-absorbing connection with the other head D'. A bracket arm 65 projecting upwardly from head D' carries a pair of buffer members 66 which are adapted to engage alternatively with a pair of downwardly projecting stop pins 67 and 68 on the upper platform 21. The head D' swings through an arc of approximately 180° (toward the observer as seen in Fig. 1) and its movement is limited at each end of this arc by the stop pins 67 and 68. In an exactly similar manner, a stop bracket 69 formed on the other head D is adapted to engage a similar pair of stop pins projecting downwardly from platform 21 to limit the swinging movement of head D through the opposite arc of approximately 180°.

The driving mechanism E comprises a rather large main cam plate 70 which is journaled by means of bearing 71 on the lower portion of vertical shaft 50. A circular gear rack 72 is secured to the periphery of cam plate 70, and the cam plate is rotated continuously in one direction at a constant speed by an electric motor 73 through connections comprising (Figs. 2 and 5) motor shaft 74, worm gearing in the casing 75, transverse shaft 76, bevel gearing 77, vertical stub shaft 78, and the gear 79 on shaft 78 meshing with the gear rack 72. The main cam path formed in the upper surface of cam plate 70 (see Fig. 27) comprises arcuate portions 80, 81 and 82 respectively centered about the axis 13 and corresponding to the dwells of the heads at the several stations, and inclined portions 83, 83ª and 83ᵇ which cause the swinging movements of the heads as they move from station to station. The lengths of the arcuate portions of the cam determine the relative lengths of the dwells at the several stations, and the lengths and relative inclinations of the inclined portions connecting the arcuate portions determine the speed of movement of the heads as they swing from station to station. A cam pin or roller 84 which travels in the main cam slot (being shown in the portion 80 thereof in Fig. 27) is carried by a swinging frame 85 pivoted about the stationary journal 86 and also comprising a rack 87 which meshes with a gear 88 pivoted on stationary journal 89. A rack 90 secured to gear 88 and also swinging about journal 89 meshes with the driving gear 55 at the lower end of vertical shaft 50. It will thus be apparent that the movement of cam roller 84 in the main cam slot will determine the swinging movements of the head D. The main cam 70 rotates at substantially constant speed in the direction of the arrow, Fig. 27. As long as the roller 84 is in the portion 80 of the cam slot, no movements will be imparted to the train of racks and gears just described and the head D will remain stationary in the molding or blowing position shown in Fig. 1. When the roller 84 passes into the inwardly inclined portion 83 of the cam slot the head D will be swung rather rapidly backward through an arc of approximately 180° to the gathering position in which the head D' is now positioned in Fig. 1. When the cam roller enters the inner arcuate portion 82 of the cam slot the head will dwell in this gathering position. As the roller passes into the outwardly inclined portion 83ª of the cam slot the head D will be swung from the gathering position to the "optic" position where it will dwell while the roller is in the arcuate portion 81 of the cam slot. It will then pass into the short outwardly inclined portion 83ᵇ of the slot which swings the head from the "optic" position to the blowing position in which it is shown in Fig. 1. A second cam roller 84' is positioned in the cam slot at a diametrically opposite point or approximately 180° from the cam roller 84, and this cam roller is connected through a similar series of gears and arcuate racks (indicated by similar primed reference characters) to the driving gear 54 secured to the lower end of sleeve 47 and consequently swinging the other head D'. The latter gear train includes one extra idler gear 142 for reversing the direction of the swinging movements imparted to head D'. It will thus be seen that the single driving cam 70 will successively impart similar movements to the two heads D and D' but these movements of the two heads will be 180° out of phase with one another, that is one-half the time of a complete cycle of operations.

*Gathering ram*

The gathering mechanism C is of a known type and does not differ materially from a gathering ram heretofore in use except that it is permanently positioned, that is does not partake of any of the swing or traversing movements of the heads D and D', and new control connections are provided. The ram comprises a pair of similar heads 15 which are projected into the furnace to gather charges of glass and are withdrawn from the furnace to discharge these glass blanks to one pair of spindles F. The heads are projected into and withdrawn from the furnace by means of a single fluid pressure cylinder indicated generally at 91. The valves for alternately admitting this pressure fluid to the two ends of the cylinder are controlled by a swinging lever or crank arm indicated at 92. The closure plate or cap 16 of each head 15 and the shearing device 18 for removing the surplus metal are actuated at proper time intervals by means of lever and link mechanisms in the usual manner. A passage 93 (Fig. 15) leads to the glass-holding cavity within each head 15, and by a suction exerted through this passage the glass blank is drawn into the chamber 134 from the mass 2 within the furnace, and a puff of air blown through this same passage is adapted to discharge the glass blank from the head 15 so that it will fall into the receiving mechanism at one end of spindle F. The valves for alternatively connecting the vacuum or air pressure with the passages 93 are controlled by a rocking lever 94 at the upper end of the ram-assembly.

A vertical control shaft 95 is suitably journaled within and extends up through one of the tubular frame standards 22 at one corner of the machine. A gear 96 is keyed on the lower end of shaft 95, and an intermediate gear 97 freely journaled on the stub shaft 98 connects the gear 96 with the gear rack 72 on main cam 70 (Fig. 6). The relative sizes of the gears are such that the gear 96 and shaft 95 will be rotated twice for each revolution of the main cam 70, that is shaft 95 will make one complete rotation for each complete cycle of operations of either head D or D'. On the upper end of shaft 95, above the frame platform 21, is fixed a cam-disc 99. On the upper surface of this cam disc are adjustably secured two pairs of cams 100, 101 and 102, 103 (Figs. 25 and 26). The inner arm 104 of a bellcrank lever pivoted at 105 in a suitable bracket 106 carries a roller 107 adapted to be successively engaged by the cams 100 and 101 to swing the bellcrank about its fulcrum. The other arm of 108 of this bellcrank lever is connected by rod or link 109 with one end of the lever 94 which controls the admission of air or vacuum to the gathering head 15. Suitable ball or universal joints 110 may be used to connect the two ends of link 109 with the levers 108 and 94 respectively. A second bellcrank also pivoted at 105 in the bracket 106 has an inner arm 111 provided with a roller 112 which alternately engages the two cams 102 and 103. The outer arm 113 of this bellcrank is connected through link 114 with the lever 92 which controls the movements of the ram-operating cylinder.

As the cam-disc 99 is rotated continuously in the direction of the arrow (Fig. 25) the cam 102 will first engage the roller 112 and swing bellcrank 111 to cause air to be admitted to the upper end of cylinder 91 and project the heads 15 into the furnace. Cam 100 will next engage the roller 107 to swing lever 104 and thus move lever 94 to connect the vacuum with the gathering heads 15 to suck charges of molten glass into the heads. Immediately thereafter the cam 103 will actuate lever 104 in the opposite direction to cause air pressure to be admitted to the lower end of cylinder 91 to withdraw the heads 15 from the furnace. During this outward movement of the heads the shearing device 18 will cut away the surplus glass, and when the heads are in position over the spindles the cap 3 will be automatically opened by the lever mechanism hereinabove generally referred to. At this time the cam 101 will engage the lever 104 to swing lever 94 in the opposite direction and admit a puff of air to each head 15 so as to discharge the glass blanks from the heads. As already noted, the cam 99 will rotate twice for each revolution of the main driving cam 70, so that this cycle of operations of the gathering mechanism C will be repeated as each head D or D' dwells at the gathering station.

It might here be stated that in a copending application of Harold R. Schutz, filed April 4, 1932, Serial No. 603,053, I have disclosed an apparatus for making footed glassware wherein certain movements are imparted to portions of the molds when the glass blanks are at the blowing and molding stations. It will be noted that the gear 96 at the lower end of shaft 95 (Fig. 6) is provided on its lower face with an annular slot 115 in which certain cam sectors may be mounted. These cams are employed for giving the desired movements to the mold parts in the footed glassware apparatus disclosed in said copending application.

The spindle

One of the spindles F (of which four are used) will now be described, referring more particularly to Figs. 28, 29, 30 and 31. The spindle comprises an outer tube or barrel 116 which is slidably and rotatably mounted in a casing indicated in dotted lines at 117 in Figs. 28, 29 and 30. The barrel can rotate in the casing at all times, but further upward movement, when in the position shown in Figs. 28 and 29, is prevented by the outstanding collar 118 of the lower end of the barrel. However, the barrel may be moved downwardly through casing 117 to the position shown in Fig. 30. Throughout a portion of its length the barrel 116 is formed with gear teeth 119 which mesh with a driving gear hereinafter described in all positions of the barrel. A second sleeve 120 provided with an annular collar or cap 121 at its lower end is slidably fitted within the barrel 116. An expansion spring 122 confined between collar 121 and an inner flange 123 of the barrel normally holds sleeve 120 down with the flange or head 124 at its upper end in engagement with the upper end of barrel 116 as shown in Fig. 28. The sleeve 120 carries the spindle-fork comprising the two diametrically opposite arms 125. A third sleeve 126 is slidable longitudinally within sleeve 120. The lower end of sleeve 126 is connected with the inner race-ring 127 of a roller thrust bearing assembly, the outer ring 128 of which is carried by the operating collar 129 by means of which the spindle parts are moved longitudinally. The roller bearing permits the spindle to rotate with relation to the non-rotatable operating collar 129. Sleeve 126 is connected at its uper end by screws 130 with the cup-shaped hinge-pin holder 131. A compression spring 126' confined between portions of sleeves 126 and 120 normally urges sleeve 126 downwardly so that the hinge-pin holder 131 rests on the spindle-fork 125 as shown in Fig. 28.

The inner blow-pipe assembly comprises a lower tube 132 with which is connected an upper tube extension 133 extending up to the inner plunger 7. An air passage 135 extends through these tubular sleeves and has lateral extensions 136 near its upper end leading to outlet grooves 137 formed in the side walls of plunger 7. At its lower end tube 132 is connected through packing 138 into the non-rotary block 139 provided with nipple 140 with which is connected the flexible air-supply pipe hereinafter described. The end block 139 is adapted to contact with the stop member 141 to prevent downward movement of the blowpipe assembly from the positions shown in Figs. 28 and 30. This blow-pipe assembly can however be moved upwardly away from stop 141 as indicated in Fig. 29. A plunger-cup or blank-holder 5 slidably encloses the inner plunger 7, and has a lower sleeve extension 143 and 144 slidably fitted about the stem 133 and provided with an inner packing assembly 145 to prevent the loss of air under pressure from cup 5 around the stem 133. A compression spring 146 tends to draw the blank-holder 5 downwardly within the hinge-pin holder 131, as shown in Fig. 29. A sleeve 147 slidably fitted about sleeve 132 has an annular head 148 at its upper end in which are fitted screw-stops 149 which extend through slots or openings in the sleeves 126, 120 and 116, so as to permit limited relative longitudinal movements of these sleeves, causing all of them to rotate in unison. A stop-screw 150 secured in sleeve 132 is slidable in a slot 151 in sleeve 147 so as to prevent relative rotation of these sleeves. An inner expansion spring 152 is confined between sleeve 132 and sleeve 144 at the lower end of the plunger or blank-holder 142. A spring 153 is confined between a lower portion of sleeve 126 and the head 148 at the upper end of sleeve 147.

A pair of similar semi-cylindrical spindle jaws 6 have upper inwardly extending flanges 155 which project over the upper edges of the plunger-cup or blank-holder 5 so as to grip the lip or flange 4 of the glass blank 1 (see Figs. 16 and 17). The jaws have overlapping ears 156 which are pivoted on hinge pins 157 mounted in the cup-shaped hinge-pin holder 131 (Fig. 31). Short links 158 pivotally connect ears 159 formed on the back of each jaw with the upper ends of the yoke arms 125.

In the normal or neutral position of the parts as shown in Fig. 28, the operating collar 129 will be held in the position shown by means hereinafter described, and the relative strengths and positioning of the several springs within the spindle structure are such as to hold the relatively slidable parts normally in the position shown in this figure. When a glass blank is to be received at the gathering station (see Fig. 16) the operating collar 129 is moved up by means hereinafter described to the position shown in Fig. 29. During the first stage of this movement the stop pins 149 move to the top of the slots in barrel 116, and the sleeve 120 moves up until it engages the stops 149. This permits the spindle yoke 125 to move up a short distance through the relatively fixed barrel 116 to the position shown in Fig. 29. During this first movement the hinge-pin holder 131 moves with the spindle yoke 125, but the central plunger assemblies 5 and 7 do not at first move upwardly, so that the clearance indicated at 160 (Fig. 28) is taken up and the jaws 6 move upwardly away from the upper edges of holder 5 as indicated in dotted lines Fig. 28. No further upward movement of spindle yoke 125 is possible, but the inner blow-pipe assembly and the hinge-pin holder 131 now move upwardly as a unit thus causing the jaws 6 to swing outwardly to open position as indicated in Figs. 29 and 31. It will be noted that the entire blank-receiving assembly has been elevated above its normal position and is ready to receive the blank 1 as in Fig. 16.

A return movement of the operating collar 129 causes a reversal of the several movements just described. The jaws 6 first move into closed position and later move down relative to the holder 5 so as to clamp the lip 4 of the blank 1. When the parts have returned to the normal position shown in Fig. 28 the blank will be held in position as shown in Fig. 17. The operating collar 129 is then moved downwardly from the neutral position shown in Fig. 28 to the plunger operating position shown in Fig. 30. This causes all of the spindle elements to move downwardly as a unit, with the exception of the blow-pipe assembly and inner plunger 7 which cannot move downwardly on account of the engagement of head 139 with the fixed stop 141, already described. As a result the inner plunger 7 will be elevated within the blank-holder 5 as shown in Figs. 30 and 18 so as to punch an opening in the lower portion of blank 1. The operating collar 129 is now returned to the neutral position shown in Fig. 28 thus causing all of the spindle elements to return to the position shown in that figure. A puff or puffs of air are now admitted through the passage 135 and passages 136 and 137 in the inner pluger 7, this air expanding the molten blank 1 by enlarging the opening formed by the plunger so that the blank will assume a form somewhat as indicated at 8 in Fig. 19.

The entire spindle assembly is now inverted end for end (by mechanism hereinafter described) so that the glass blank will be suspended as shown in Fig. 20, and the admission of air through passage 135 is subsequently controlled so as to expand the blank as indicated in Figs. 20 to 23 inclusive. During all of these steps the spindle may be rotated or oscillated about its longitudinal axis by means of the gear which meshes with the gear teeth 119 formed on barrel 116, all as hereinafter described.

Spindle-carrier and spindle inverting mechanism

The spindle-supporting frame 117 hereinabove referred to comprises a main cross frame member formed with the two semi-cylindrical rear halves of the bearings for a pair of spindles F, and front semi-cylindrical bearing halves 161 which are pivoted to frame 117 at 162 and provided with clasps 163 centrally pivoted to the members 161 at 164. A spring 165 tends to swing the clasp 163 so that the hook 166 will engage a member 167 on the frame 117 (Figs. 32 and 33). By pulling out on the handle 168 the clasp may be unlocked and the member 161 swung back about the hinge 162 so that the entire spindle assembly may be removed and replaced.

The operating collars 129 of the two spindles are carried by a cross member 169 from the central portion of which extends a stem 170 having an enlarged head 171. Suitable mechanism engages and reciprocates this head 171 when the spindles are at the gathering station to open and close the jaws and operate the inner plunger. At the blowing station, after the glass article is completed, the head 171 is again reciprocated in one direction to open the jaws and release the finished article.

A frame member 172 extends centrally from cross frame 169 between the two spindles and is movably guided in a central portion of frame 117. A tube 173 is secured between upper and lower platforms 174 and 175 in the frame 172. A pair of expansion springs 176 surrounds the tube 173 and are confined between similar spring-retaining washers 177. A pair of similar cross-arms have central annular portions 178 surrounding and slidable on the tube 173, and end portions 179 which slide along guideways 180 on the frame 117. The springs 176 through retainers 177 force the cross arms 178 outwardly away from one another and into engagement with the fixed stops 181 on frame 117. This is the normal or neutral position of the parts as shown in Fig. 34. The springs 176 are sufficiently powerful to hold all of the spindle assembly in this position whether the spindles are in gathering position as shown in Figs. 28 to 30, or in inverted position as shown in Figs. 33 and 34.

By suitable means hereinafter described which engages with the head 171, the movable assembly comprising the stem 170, cross arm 169 carrying the operating collars 129, and the central frame 172 may be moved in either direction so as to operate the spindle jaws and plunger, as already described. These movements will force one or the other of the cross bars 179 towards the center, compressing the springs 176 since the other cross bar 179 is held against movement in this direction by the stops 181. No matter in which direction this movement has been, the expansion of springs 176 will tend to return the parts to the neutral position shown in Figs. 33 and 34.

Keys 182 formed on one side of the blow-pipe heads 139 are slidable in guides 183 formed on the cross bar 169 so as to hold the heads 139 against rotation and prevent twisting of the air-pipe connections.

The spindle supporting frame 117 is mounted at one end of a gear-housing 184 having an inner hollow cylindrical extension 185 connected at 186 to a similar cylindrical member 187, the members 185 and 187 being journaled by means of roller bearing 188 on a tubular member 189 projecting outwardly from the gear casing 190 which in turn is carried by the supporting head D or D'. Sleeve 187 is formed with an annular series of gear teeth 191 which are in mesh with a gear 192 journaled on a stub-shaft 193 projecting outwardly from housing 190 (Fig. 39). A swinging frame 194 is pivoted on a vertical stub shaft 195 mounted in the top of gear casing 190, and is formed at its outer end with a downwardly facing arcuate rack 196 which meshes with a bevel gear 197 keyed to the gear 192 already described. One arm 198 of a bellcrank also pivoted on shaft 195 carries a cam roller 199, the other arm 200 of the bellcrank being formed with a yoke 201 which spans an upward extension 202 of the swinging rack 194. A shock absorbing assembly 203 is mounted in member 202 and engages the side arms of the yoke 201.

The cam roller 199 travels in one of the downwardly opening cam slots of a cam plate 204 which is mounted beneath the upper frame platform 21 (Figs. 1 and 36). The cam plate 204 is formed with two similar cam slots 205 and 206, one for each of the spindle assemblies. It will be noted that as one of the heads D or D' moves from the gathering to the blowing station or vice versa the roller 199 will travel in the cam slot 205 (or 206) and the bellcrank 198 will swing about the pivot 195. Through the shock absorbing connection 203 the bellcrank will swing the arcuate rack member 196, and through the gear train consisting of bevel gear 197, spur gear 192 and gear teeth 191 will swing the entire spindle-carrying frame about the horizontal axis indicated at 207 in Fig. 34. The cam slots 205 and 206 are so formed that when the heads are in the gathering position the spindles will be turned upwardly as indicated in Figs. 28, 29 and 30. As the head swings away from the gathering station, the spindles are first swung over to a position somewhat below the horizontal, where they remain for a short time, the spindles being rotated about their longitudinal axes at this time to prevent deforming the partially expanded glass blanks. The spindles are then swung down until completely inverted as shown in Figs. 33 and 34, and at the right of Fig. 1. The spindles remain in this position during the rest of the cycle and until shortly before they are returned to the gathering position. The duration of these spindle swinging movements is indicated in the fourth horizontal column of the timing chart shown in Fig. 57.

A pair of adjustable stops 208 and 209 are mounted in arms 210 projecting from the rotatable frame ring 187, these stops engaging with the projecting end portion 211 of the shaft 193 to limit the spindle swinging movement at each end of the 180° arc of travel. (See Figs. 32 and 40.) The shock-absorber 203 will yield to permit a small additional movement of the operating bellcrank after the stops have been engaged thus holding the spindle-assembly firmly in either of its inverted positions.

*Spindle rotating and oscillating mechanism*

A horizontal drive shaft 212 extends longitudinally through the gear housing 190 (Fig. 34) and is supported in suitable bearings adjacent its ends, the outer end of this shaft being connected by a sleeve 213 with a shaft extension 214 journaled at 215 in the tubular member 189 and carrying a bevel gear 216 at its outer end. It will be noted that the shafts 212 and 214 and bevel gear 216 are journaled on the horizontal axis 207 previously referred to about which the spindle assembly is oscillated. A normally vertical shaft 217 is journaled adjacent its ends in the gear housing 184 and carries a bevel gear 218 meshing with the bevel gear 216. A spur gear 219 also secured on shaft 217 meshes with a pair of similar spur driving gears 220 and 221 (Fig. 40) which engage respectively with the gear teeth 119 on the two spindles F. It will be noted that any rotary or oscillating movement imparted to the drive shaft 212 will be transmitted through the train of gearing just described to the two spindles F. As the spindle assembly is inverted, the bevel gear 218 will simply run around the bevel gear 216 without disturbing this gear train.

Rotatably mounted on the drive shaft 212 are a rotating sleeve 222 and an oscillating sleeve 223 between which is positioned a slidable clutch member 224 keyed to shaft 212. This clutch member 224 is formed at its opposite ends with teeth adapted to engage with similar clutch teeth on the members 222 and 223 respectively.

A constantly rotating motor 225 is supported on the head at one side of gear casing 190 and is connected at 226 with a shaft 227 journaled transversely in housing 190 and carrying a worm 228 (Figs. 38 and 39). Worm 228 meshes with and drives a worm wheel 229 keyed on a transverse counter shaft 230. Spur gear 231 also keyed on shaft 230 meshes with the spur gear 232 formed on rotating sleeve 222 so as to constantly drive this sleeve in one direction. On the projecting end portion 233 of shaft 230 is secured a crank arm 234 (Figs. 39 and 41) carrying a crank pin 235 on which is journaled one end of a link 236, journaled at its other end on a crank pin 237 carried by a crank 238 secured on sleeve 223 (Fig. 34). The crank arm 238 is longer than the crank arm 234 so that a continuous rotary movement of crank 234 will cause an oscillating movement of the longer crank 238, and consequently will impart a continuous oscillating movement to the sleeve 223.

A rock shaft 239 journaled in the lower portion of housing 190 carries a yoke 240 at its inner end engaging a groove in the shiftable clutch member 224. A crank arm 241 at the outer end of rock shaft 239 carries a pin 242 having a head 243 slidable on push rod 244 between a pair of similar compression springs 245. Longitudinal movements of the push rod 244 will, through the yieldable connection formed by springs 245, swing the crank arm 241 and rock shaft 239 and through yoke 240 will shift the clutch 224 alternately into engagement with either of the sleeves 222 or 223. The other end of push rod 44 is pivotally connected at 246 with a crank arm 247 secured to one end of a rock shaft 248, a second crank arm 249 at the other end of this shaft carrying a cam roller 250. The roller 250 is adapted to engage a certain fixed cam 251 (Fig. 1) depending from the upper frame platform 21. A compression spring 252 confined about the outer portion of push rod 244 serves to normally move the parts in such a direction that the clutch member 224 will normally be in engagement with constantly rotating sleeve 222 so that the spindles F will be rotated continuously about their longitudinal axes as long as the motor 225 is energized. At certain times during the making of so-called "optic" ware, as hereinafter described, it is preferable to oscillate the glass blanks rather than rotate them continuously. The cam 251 is so adjusted that at the proper time the connections just described will be operated to shift the clutch member 224 into engagement with the oscillating sleeve 223, thus causing the shaft 212 and the connections therefrom to the spindles to be oscillated instead of rotated. When the roller 250 passes out of engagement with the high portions of cam 251 the spring 252 will return the parts to the normal position so as to cause continuous rotation of the spindles.

*Spindle-jaw and spindle-plunger operating mechanism*

At the gathering station a mechanism H is provided (Figs. 1 and 42 to 46 inclusive) for imparting the necessary longitudinal movements to the spindles F to open and close the spindle-jaws and to operate the spindle-plunger. In a closed fluid-pressure cylinder 253, which is mounted on the lower frame platform 19 at a position adjacent the furnace A and beneath the opening 14, is a lower piston 254 which is normally urged upwardly by a spring 255 to a position midway the height of the cylinder where its upward movement is limited by the engagement of an outwardly projecting collar 256 on the piston with a shoulder 257 formed on the inner wall of the cylinder. An upper piston 258 is slidably fitted within cylinder 253 above the lower piston 254. A piston rod 259 projects upwardly from piston 258 through a packing 260 in the top of the cylinder and is hinged at 261 to an upper piston-rod extension 262 carrying at is upper end a yoke 263 adapted to engage about the head 171 on stem 170 of the spindle-operating mechanism, as already described. It will be understood that as the spindle-assembly swings through its annular path of travel, the head 171 will move into engagement with the yoke 263 when the spindles are positioned at the gathering station. Vertical movements of the piston rod 262 will then be imparted to the stem 170.

The rod extension 262 is slidable through a bushing 264 in a swinging frame 265 the arms of which are pivoted at 266 (coaxially with pivot 261) in brackets 267 mounted on the cylinder 253. A link 268 is pivoted at 269 to the swinging frame 265 and is pivotally connected at its other end to one arm 270 of a lever intermediately pivoted at 271 in a bracket 272 on the cylinder 253. The lower arm 273 of the lever is pivotally connected at 274 with a push rod 275. A compression spring 276 is confined about one end portion of rod 275 between stops 277 on the rod and a fixed bracket 278 so as to normally urge the rod 275 to the left (Fig. 43) and swing the lever and link mechanism to the position shown in solid lines in this figure so that the rod extension 262 will be in vertical alignment with the main piston rod 259. The stop members 141 are carried by stems 279 adjustably mounted in the swinging frame 265, and when in the normal position shown in Figs. 42 and 43 the stops 141 will be positioned directly beneath the blow-pipe heads 139 on the spindle so as to prevent downward movement of these blow-pipe assemblies when the spindles are moved to the plunger-operating position shown in Fig. 30.

The inner end of rod 275 is pivotally connected with crank arm 280 at the upper end of a vertical shaft 281 having at its lower end a crank arm 282 carrying a roller 283 which engages with a cam 284 secured about the periphery of the main cam disc 70 (Figs. 1, 2 and 27). When the high portions of cam 284 engage the roller 283 the rod 275 will be pulled toward the right (Fig. 43) in opposition to the spring 276 to swing the lever and link mechanism and move the swinging frame 265 to the position shown in dotted lines Fig. 43. This swinging movement (which does not start until head 171 has moved laterally out of the yoke 263) is for the purpose of removing the yoke 263 and stops 141 from the path of travel of the spindle assembly which commences to swing about its horizontal axis to invert the spindles before it has cleared the normal vertical positions of the yoke and stops.

Referring now again more particularly to Figs. 42 to 46 inclusive, a supply conduit 285 for air or other fluid under pressure leads into the upper end of the cylinder 253. A similar pipe or conduit 286 leads into the lower end of the cylinder, and a pipe 287 leads into an intermediate portion of the cylinder between the two pistons 254 and 258. At 288 and 289 are indicated two similar slide-valve assemblies each comprising a housing in which is positioned a slidable valve member 290 adapted to bridge in one of its positions a pair of outlet passages 291 and 292 and open a third passage 293 to the interior of the housing. When the slide 290 is moved to its opposite position the ports 292 and 293 will be connected and the third port 291 opened to the interior of the housing. A supply pipe 294 for air or fluid under pressure has branches 295 and 296 leading to the two valve housings. Suitable mechanism hereinafter disclosed is provided for shifting the movable valve members 290 in properly timed relation to one another. The central port 292 of each of the valves is open to the atmosphere to serve as an exhaust port. The pipes 285 and 286 leading to the top and bottom respectively of cylinder 253 are connected with the ports 291 and 293 of valve 288. The third supply pipe 287 leading to the center of the cylinder is connected with port 291 of the second valve 289. The port 293 of this valve is permanently closed and could be entirely omitted.

In the first, or normal position of the parts shown in Fig. 44, both valve members 290 are moved to the left so as to connect both pipes 285 and 287 with the exhaust ports. Fluid pressure is supplied through pipe 286 to the lower end of cylinder 253 so as to move lower cylinder 254 to its normal upper position, thus elevating the upper piston 258 to its normal mid or neutral position. When the spindles are to be elevated and the jaws opened the lower slide valve 290 is moved to the right as shown in Fig. 45. This admits fluid under pressure to the central supply conduit 287 which leads in between the two pistons 254 and 258. Fluid under pressure is still being admitted through pipe 286 beneath the lower piston 254 thus balancing the pressure on both sides of this piston which will be held in its elevated position by the spring 255. The pressure fluid admitted through pipe 287 will elevate the upper piston 258, thus raising the head 171 and stem 170 and opening the spindle-jaws. For the succeeding plunger-operating step, the valves are shifted as shown in Fig. 46, the upper slide valve being moved to the right and the lower valve to the left. This serves to open the intermediate and lower supply pipes 287 and 286 to the exhaust but admits pressure fluid through upper pipe 285 to the space above the upper piston 258. This will first move the upper piston downward into engagement with the lower piston 254 and then will move both pistons down to the extreme position shown in Fig. 46. The head 177 and stem 170 will be moved past their neutral position to the extreme lowered position of Fig. 30 thereby causing the plunger 134 to be inserted in the glass blank. As a final step the upper valve 290 is again moved to the left thus opening the upper pipe 285 to the exhaust and supplying pressure fluid through pipe 286 to the lower end of the cylinder. This will return the two pistons to the mid position shown in Fig. 44. The mechanism for operating the valves 284 and 289 in properly timed relation will be referred to hereinafter.

When the spindle assemblies (on either head D or D') have been inverted and moved to the blowing or finishing position shown at the right of Fig. 1, and the glass article has been completed, it is necessary to again open the spindle jaws to release the finished article as indicated in Fig. 23. For this purpose a mechanism J is provided (see Figs. 1, 25 and 26). On the bottom of the rotating cam disc 99 (which carries the ram-controlling cams on its upper face) is formed a cam slot 297 in which travels a cam roller 298 carried by a slide 299 movable in suitable guides formed in a bracket plate 300 carried by the upper platform 21. The cam slot 297 is circular throughout the greater portion of its length but is formed with a single offset portion 301 so as to cause a shifting movement of the slide 299 once during each rotation of the cam disc. It will be remembered that this cam disc makes one rotation for each cycle of movements of each head D or D'. A link 302 connects an ear on slide 299 with one arm 303 of a bellcrank pivoted at 304 in the bracket 300, the other arm 305 of this lever being connected through link 306 with a plunger 307 slidable vertically through a guide 308 in frame 21 and carrying at its lower end a yoke 310 adapted to engage about the head 171 on spindle-operating stem 170. When the blowing operation has been completed, the rotating cam-disc 99 will cause a downward reciprocation of the plunger 307 thereby opening the spindle jaws and releasing the finished glass articles. Any suitable means, not herein disclosed, may be provided for removing the finished articles after they have been released from the spindle jaws.

*Blowing and cooling air mechanism*

Air under suitable pressure is continuously forced (in any suitable manner not here disclosed) into the reservoir 311 formed in the top plate 56 of the machine frame (Fig. 1). The upper arms 59 and 61 of the heads D and D' respectively are hollow and communicate with the reservoir 311 in any position of the head, suitable packings being provided between the relatively rotatable members. A conduit 312 extends downwardly through each head and divides into laterally extending branch conduits 313. Substantially horizontal air conduits 314 extend forwardly from the conduits 313 and terminate in discharge spouts 315 directed toward the spindle heads and the glass blanks carried thereby. (See Figs. 1, 48, 51 and 52). Each of the conduits 314 is divided by a substantially horizontal partition into a larger upper air pasage 316, and a smaller lower passage 317. Cooling air is constantly flowing through the lower passage 317 and is discharged through the spout 315, the volume of this air flowing through each passage 317 being controlled by a valve 318 having a manually operable handle 319. The air flow through each of the larger passages 316 is controlled by a butterfly valve 320 carried by a downwardly projecting shaft 321 on which is secured a crank arm 322. Each crank arm 322 is provided with a plurality of pivot openings 323 spaced at varying distances from the axis 321, with one of which is connected one end of a link 324, the other ends of these links being connected with the cross bar 325 of a slide 326 mounted on the lower portion of the valve assembly indicated generally at M. An expansion spring 327 normally urges the slide 326 inwardly or in such a direction as to close the valves 320, but when the blanks are brought into final blowing position within the finishing mold, a shoulder 328 of a portion of the mold mechanism (Fig. 48) engages the inner end of slide 326 and pushes this slide outwardly so as to open the valves 320 and permit an increased flow of cooling air through the spouts 315.

Each of the valve assemblies comprises a pair of similar upper "puff" valves M', one for each of the spindles F on that head, and a pair of lower "blow" valves M. The valve assembly is best shown in Figs. 48 and 52, Fig. 49 is a horizontal section through the blow valves, and Fig. 50 a similar horizontal section through the puff valves. The puff and blow valves for each spindle of the pair are entirely distinct from one another and are substantial duplicates, but both are simultaneously operated by the same slide member, as hereinafter described. A description of one valve of each pair will therefore suffice for both.

A flexible pipe 329 extends from a suitable connection with one of the air supply conduits 313 to a nipple 330 leading into a vertical passage 331 which supplies air to both the puff and blow valves. From the vertical outlet passage 332 for both of the valves extends a nipple 333 from which a flexible pipe section 334 extends to the inlet nipple 140 of one of the spindles F. Each valve (both puff and blow) comprises a horizontal air passage 335 communicating at 336 with the supply passage 331 and communicating with a laterally extending passage 337 extending into the central valve slideway 338. A tapered valve plunger 339 is carried by a threaded stem 340 having an outer adjusting head 341 and is adapted to be projected more or less into the opening in an orifice bushing 342 so as to control the volume of air flowing through the valve passages. A passage 343, parallel with passage 337, leads from outlet duct 332 into the central valve slideway 338. The description as thus far given applies to both the puff and blow valves. Referring now more particularly to Fig. 49 showing the blow-valve, a third passage 344, parallel with the passages 337 and 343 and equally spaced therefrom, leads from the central valve slideway to a discharge outlet 345 communicating with the atmosphere. A pair of similar slidable valve members 346 are positioned within the slideway 338 and forced apart by springs 347 so as to maintain fluid tight connections with the opposite walls of the slideway. Each valve member 346 has an inner passage 348 having a pair of similar spaced outlets 349 adapted to simultaneously communicate (when the slide valve is in proper position) with two of the passages 337, 343 and 344. An operating slide 350 having a roller 351 at its outer end adapted to engage a cam, is slidable between guideways in the valve frame, and a plunger or stem 352 is secured in the inner end of slide 350 and extends between the two slide valves 346 and is provided with a collar 353 adapted to engage the inner ends of the slide valves so that these valves must move longitudinally with the operating slide 350. The spring 354 normally holds the slidable assembly out to the position shown in Fig. 49, in which position the supply conduit 337 is closed and the conduit leading to the spindle is also closed. If the slide assembly is moved to its extreme inner position, the valve passage 348 with its outlets 349 will bridge or connect the passages 337 and 343 so that the passages leading to the spindle will be connected with the air supply. As the valve assembly is moved outwardly, the passage 348 with its outlets 349 will connect the spindle passage 343 with the exhaust passage 344 so as to exhaust the air pressure from the spindle and the interior of the glass blank. Suitable cams are brought into engagement with the roller 351 at certain times in the cycle of operation to push in the slide valve assembly and connect the air passages as just described.

The puff valves M' as shown in Fig. 50 are much the same as the blow valves described above, except for the omission of the air-release passages 344 and 345. In a slotted annular cam-ring 355 supported by a plurality of upwardly and outwardly projecting arms 356 attached to the standard 23 (Figs. 1 and 53), are inserted at suitable intervals a plurality of short cams 357 which engage the roller 358 at the outer end of the slide 359 which operates these puff valves so as to push the slide valves in for an instant and immediately release them, thus admitting a puff of air through the passages to the interior of the glass blank. It is by means of such a puff that the blank is initially expanded as shown in Fig. 19, and these air puffs are admitted at intervals thereafter as may be found desirable or necessary. When the puff valve moves out to the position shown in Fig. 50 it does not release the charge of air within the spindle, but this may be done by pushing in the corresponding blow-valve slide to its mid position as already described. By a properly synchronized control of the two valves the air pressure within the glass blank may be built up and released as desired.

*Finishing mold mechanism*

The mold mechanism K (Figs. 1, 48 and 53) comprises a pair of similar vertically split molds of usual construction, each comprising a pair of sections 360 carried by arms 361 pivoted on axis 362. Links 363 connect outwardly projecting elbows 364 on the arm 361 with an intermediately pivoted cross link 364' mounted on a main slide member 365 movable in suitable guides on the supporting frame 366. As the slide 365 is moved in or out the mold sections 360 will be opened or closed. The supporting frame 366 has side arms 367 hinged to fixed supports at 368 so that the mold assembly may be swung up to the operating position shown in solid lines in Figs. 1 and 48, or swung downwardly as indicated in dotted lines in Fig. 1, at which time the molds will be immersed in the cooling liquid carried in tank 369. For imparting these swinging movements to the frame, a fluid pressure cylinder 370 is hinged to the machine frame at its lower end 371, and has a piston rod 372 connected to one arm 373 of a bellcrank hinged to the machine frame at 374, the other arm 375 of the bellcrank being pivoted to one end of a link 376, the other end of this link extending slidably through a block 377 pivotally mounted on a lower bracket extension 378 of frame 366. A compression spring 379 surrounds the link 376 between block 377 and the opposite pivoted end portion of the link. When fluid under pressure is admitted to the lower end of cylinder 370, the lever and link connections will be moved in such a direction as to raise the mold assembly to the operative position. When the fluid pressure is admitted to the upper end of the cylinder the mold assembly will be lowered to the dotted line position.

A second fluid pressure cylinder 380 suitably supported in the machine frame contains a piston 381 from which extends a piston rod 382 connected with a slide frame 383. Suitable link connections indicated generally at 384 connect this movable assembly with the slide member 365. These connections are such that the swinging movement of frame 366 will not cause relative movement of the slide member 365 on the frame. When fluid pressure is admitted to the rear end of cylinder 380, the piston will be moved forwardly, (or to the right as seen in Fig. 48) thus shoving the slide 365 forwardly and closing the mold sections 360. At the same time the slide 383 moves the shoulder 328 against the slide 326, already described, to open the valves 320 controlling the cooling air. The slide 383 also carries a cam 385 which is moved against the roller 351 to open the blow-valves and admit blowing air to the glass blank now positioned within the closed mold 360.

"Optic" mechanism

It is sometimes desirable to produce tumblers or similar hollow glassware having walls of varying thickness so as to have a wavy appearance as the light passes therethrough. This is accomplished by slightly chilling the walls of the partly completed molten glass blank at spaced intervals. When this blank is further expanded to final form within the finishing mold, the hotter glass between the chilled portions will be stretched thinner, leaving spaced apart thicker ribs on the inner surface of the tumbler, the outer surface having a true circular cross section since it is blown into contact with the walls of the mold. To accomplish this the mechanism indicated at L is provided, there being one of these optic units for each of the heads D and D' positioned at stations at either side of the finishing or blowing station, each spindle dwelling for a short time at its optic station before it moves on to the final blowing station. This "optic" operation is indicated in Fig. 21. Details of the mechanism are best shown in Figs. 53 to 56 inclusive.

Each of the optic molds 386 is of substantially well known type, being formed with downwardly converging side walls within which is a circular series of parallel spaced apart inwardly projecting ribs 387, between which may be open slots 388 to aid in cooling the mold and permitting the escape of steam. The mold has an adjustable bottom 389 in the form of a block of wood usually covered with a paper top 390 which is moistened so that it may contact the bottom of the molten glass blank without marring it. When the partially expanded glass blank is brought to the optic station, the mold 386 is elevated to a position about this blank (by mechanism next to be described), and the blank is then partially expanded so as to bring the sides of the blank into engagement with the ribs 387 at spaced intervals. The mold 386 is then lowered away from the blank which is taken on to the finishing station. The momentary contact with the ribs of the optic mold causes the blank to be slightly chilled along spaced vertical lines thus producing the desired unequal thicknesses in the walls of the finished glass article.

A vertically positioned fluid-pressure cylinder 391 is permanently supported on the machine frame at the optic station and contains a piston 392, fluid under pressure being admitted below and above this piston alternately through pipe connections 393 and 394. The piston rod 395 projects upwardly from the piston through a packing 396 in the top of the cylinder and is formed with an extension 397 of reduced diameter slidable through the intermediate portion of a supporting yoke 398. A compression spring 399 confined between a shoulder 400 on the piston rod and the upper portion of the yoke normally holds the yoke up against the head 401 of the rod. A pair of similar guide stems 402 are secured at their upper ends in the yoke and project slidably downward through ears 403 on the cylinder. These guide stems prevent rotary movement of the yoke about the vertical axis of the cylinder, and the engagement of the heads 404 on the lower ends of the stems with the ears 403 limit the upward movement of the yoke. The yoke will be stopped in its upward movement before the piston 392 has reached its extreme upper position so that further upward movement of the piston will compress the spring 399 and cause the head 401 of the piston rod to be projected above the yoke, for reasons hereinafter explained.

The side arms 405 of the yoke 398 project downwardly and then horizontally, the end portions being formed as open loops in which are positioned blocks 406 which are held in place and adjusted laterally by the screws 407 and 408. In each block 406 is positioned a bushing 409 through which a threaded sleeve 410 is adjustable vertically and held in place by nuts 411 above and below the bushing. The sleeve 410 is secured in and supports the lower portion 412 of the optic mold 386. A threaded stem 413 supports the adjustable bottom 389 of the mold, this stem meshing in an internally threaded portion of sleeve 410 and projecting downwardly through this sleeve and beyond the bottom thereof so that the mold bottom may be adjusted by screwing the non-circular lower end portion 414 of stem 413. By means of the various adjustments hereinabove referred to, each mold 386 may be adjusted both vertically and laterally so that it will be properly positioned about the glass blank when elevated.

A bell crank lever is centrally pivoted at 415 in a bracket 416 formed on yoke 398. The upper arm 417 of the bellcrank rests on the head 401 of piston rod 397. A spring 418 is interposed between a portion of the yoke and the downwardly projecting arm 419 of the bellcrank so as to hold the upper arm 417 downwardly in engagement with the piston rod. When fluid pressure is admitted through pipe 393 beneath the piston 392, the entire yoke assembly and the two molds 386 carried thereby will be elevated so as to bring the molds into position about the glass blanks. As already noted this upward movement is limited by the guide stems 402, but the piston 392 will move upwardly a limited additional distance so as to compress the spring 399 and slide the piston extension 397 through the yoke thus rotating the bellcrank about its axis 415 and compressing spring 418.

A vertical rock shaft 420 is journaled in portions of the machine frame (Figs. 53 and 54) and carries at its lower end a crank arm 421 which is pivotally connected with one end of a link 422, the other end of this link being pivoted to the arm 419 of the bellcrank (Fig. 56). A cam sector 423 is formed on a crank arm secured to the upper end of the rock shaft 420 and positioned within the annular path of travel of the roller 358 on one of the puff valves. As the head D or D' swings into position for the short dwell at the optic station, the roller 358 will run onto the cam 423 so as to partially depress the valve slide but not sufficiently to open the air passages. However, at the instant the optic molds reach their upper positions about the partially formed glass blanks, the continued upward movement of the operating piston will swing the bellcrank and link connections as already described so as to rock the cam 423 outwardly and push the valve slide in an additional distance sufficient to admit a small additional volume of air in the glass blank and expand it into engagement with the chilling ribs in the optic mold, as shown in Fig. 21. Almost immediately the air connections to the operating cylinder 391 are reversed so as to admit fluid under pressure to the upper pipe 394 and exhaust the lower pipe 393 whereupon the piston 392 will be lowered. This will first permit the springs 399 and 418 to expand thus retracting the cam 423 and closing the air valve. Further movement of the piston will lower the optic molds to their normal position below the path of travel of the glass blanks.

Experience has shown that if the glass blanks are continuously rotated in one direction within the finishing molds after they have been treated by the optic devices, the blanks will be partially twisted in the direction of rotation so that the vertical flutings formed on the inner surface of the article will be inclined in one direction. To avoid this when optic glassware is being made, the blank is oscillated alternately in each direction instead of being continuously rotated. The arc of oscillation is approximately 60° in the example here shown. It is for this reason that the oscillating mechanism previously described is provided.

Control and timing mechanism

Means is provided for controlling the successive operations of the several fluid-pressure cylinders, and of the spindle motors 225 in properly timed relation to the movements of the spindle-carrying heads. (See Figs. 2, 4, 7 to 14 inclusive and 47.) A counter shaft 424 is driven through gearing 425 from the motor driven drive shaft 76. A pair of bevel pinions 426 and 427 secured on the opposite end portion of shaft 424 mesh with and drive a pair of bevel gears 428 and 429 all mounted within a gear housing 430. Gear 428 is keyed on one end of a cam-shaft 431 rotatable in suitable bearings 432 and 433 in the housing 434. The bevel gear 429 is keyed on one end of a cam-sleeve 435 which is journaled on shaft 431. The relative sizes of the gears 428 and 429 are such that the shaft 431 will rotate twice for each revolution of the sleeve 435. The shaft 431 makes two rotations for each complete rotation of the main driving cam 70, that is shaft 431 rotates twice for each complete cycle of movements of either one of the spindle heads. The shaft 431 carries all of the cam mechanisms which control the mechanisms which operate successively for each of the heads. On the other hand, the sleeve 435 only rotates once for each complete cycle of movements of either one of the heads, and on this sleeve are mounted the cams which control the mechanisms individual to each head, that is the optic mechanisms and the spindle motors.

Each of the cam discs 436 (all of which are of substantially the same form) comprises a pair of spaced flanges 437 between which is a slot 438 in which are mounted the cam sectors 439 held in place by screws 440 inserted through one of the flanges 437. The cams which operate the valve mechanisms may be alternately offset to one side or the other as indicated at 441 so as to each contact only its individual roller as will be hereinafter apparent.

The several cam assemblies have been indicated in Fig. 7 by the characters *a* to *h* respectively. The cam mechanisms *a* and *b* control respectively the valves 289 and 288 (Figs. 44 to 46) which in turn control the spindle jaw opening and closing and plunger operating cylinder 253 (Figs. 42 and 43). The cams *c* control the mold-carrier operating cylinder 370. The cams *d* control the mold opening and closing cylinder 380. The cams *e* control the switch for one of the spindle motors 225, for example the motor on head D. The cams *h* control the motor for the other head and are exactly the same as the cams *e* except for being spaced 180° therefrom. The cams *f* and *g* control the two optic mechanisms, one for each head, and are also identical except that one set of cams is set 180° from the other set of cams.

By way of example the optic controlling cams *g* and the valves connected therewith (which are shown in detail in Figs. 13 and 14) will first be described. The air-manifold 442 is connected by pipe 443 with a suitable source of air under pressure. A branch pipe 444 controlled by cut-off valve 445 leads from manifold 442 into the valve chamber 446. From this valve chamber lead ports 447, 448 and 449. The slide valve 450 movable within chamber 446 by means of the projecting valve stem 451 has a recess 452 adapted to bridge alternatively either the ports 447 and 448 or the ports 448 and 449. From port 447 leads pipe 394 extending to the top of the cylinder 391 of the optic mechanism L. From port 449 leads the pipe 393 to the lower end of cylinder 391. The intermediate port 448 connects with an exhaust conduit 453. The bellcrank lever 454 pivoted intermediately at 455 on a stationary bracket 456 comprises a pair of arms 457 and 458 respectively carrying cam-engaging rollers 459 and 460. A third arm 461 of the lever is connected by link 462 with the lower end of valve stem 451. The cam disc 436 is provided with a pair of cams 463 and 464 adapted to engage respectively with the rollers 460 and 459. The cam assembly rotates in the direction of the arrow. In the normal position of the parts as shown in Fig. 13 the air pressure is in communication through port 447 with pipe 394 leading to the top of the optic cylinder 391 so that the optic mold will be held in lowered position. At the same time pipe 393 leading from the lower end of the cylinder is in communication with the exhaust port 453.

When the cam disc 436 has made nearly one-half a revolution from the position shown in Fig. 13, the cam 463 will engage the roller 460 and swing the bellcrank so as to elevate the slide valve 450 thus placing pipe 394 in communication with the exhaust port and admitting fluid under pressure to the pipe 393 leading to the bottom of cylinder 391. This will cause the upward movement of piston 392 as already described. Almost immediately thereafter the cam 464 will engage the other roller 459 so as to return the bellcrank and the slide valve to the original position as shown.

At this time the timing diagram shown in Fig. 57 will be briefly referred to. The time for one complete cycle of operations of one of the spindle-head assemblies has been assumed to be forty-eight seconds, and this time has been divided into eight successive periods of six seconds each, represented by the vertical columns A to H respectively. The horizontal columns indicated as 1 to 10 respectively indicate different operations, the movements or operations for one of the heads (for example head D) being indicated in solid lines and that of the other head being indicated in dash lines. It will be noted that the operations for each head are identical but are timed one-half cycle or twenty-four seconds apart. For example, referring to the movements of the optic mechanism as last described, these movements are indicated in horizontal column 5. It will be noted that the cylinder is normally down as indicated by the horizontal line but is given one up and down movement between the nineteenth and twenty-second seconds as indicated in vertical column D. The corresponding movement of the other optic cylinder takes place twenty-four seconds later as indicated in dash lines in vertical column H.

Referring now again to the control cams, the cams *a* and *b*, the relative positioning of which is indicated in section in Fig. 8 and Fig. 9 are so positioned as to give the necessary successive movements to the valves 289 and 288 as already described in connection with Figs. 44 to 46 inclusive. The cams rotate in the direction of the arrows, it being noted that Fig. 8 is looking in the opposite direction from Fig. 9. Cam 465 will first engage roller 466 and shift the valve 289 as indicated in Fig. 45. Very quickly thereafter the cam 467 will engage the roller 468 and shift valve 289 back to its original position, and simultaneously therewith the cam 469 (Fig. 9) will engage the roller 470 and shift valve 288, all as shown in Fig. 46. Shortly thereafter the cam 471 will engage the roller 472 and shift valve 288 back to its original position, thus returning the valves to the original position of Fig. 44. These valve movements which cause the spindle jaws to be opened and closed and the plunger to be inserted in the glass blank are indicated in the first time period A of the horizontal column 1 in Fig. 57. It will be noted that the jaws are again opened momentarily during the time period G, but this is done by the mechanical mechanism J already described.

The cams *c* and *d* shown in Figs. 10 and 11 respectively successively cause the mold-carrier to be elevated, the molds to be closed, the molds to be opened, and the mold-carrier to be lowered. This is all indicated in horizontal columns 8 and 9 of Fig. 57. It will be noted that at about the twenty-sixth second of the cycle the mold-carrier is raised to operative position, at the twenty-seventh second the molds are closed. At about the thirty-ninth second the molds are again opened and at the fortieth second the carrier commences to lower the molds into the cooling tank.

The operation of the optic cams F and G have already been described. The cams *e* and *h* control the respective spindle motors, as already noted. One of these assemblies is shown in vertical section in Fig. 12. The switch indicated at 473 is normally closed when the parts are in the position shown. When the cam 474 engages the roller 475, the lever 476 will be swung about its pivot 477 and through link 478 will swing the switch lever 479 to open the switch. The switch is returned to closed position by a spring, not shown. A second small cam sector shown at 480 is only employed when making optic ware, this cam opening the switch to cause the short pause in the spindle movements when the spindles are at the optic dwell, as indicated in horizontal column 7 of Fig. 57 during the time interval D.

Fig. 47 is a diagram showing some of the principal features of the wiring and piping system. Air from the compressor or other source of supply is forced through pipe 481 and trap 482 into the tank or reservoir 483. The compressed air flows through pipe 484 provided with the pressure regulator 485, through the air filter 486 to the manifold 442 already described, from which it is distributed through one of the branches 444 to one of the control valves as indicated at 487, this valve controlling the flow of pressure fluid to one end or the other of a typical operating cylinder indicated at 488. It will be noted that each supply pipe 489 leading from the valve to the cylinder is provided at one location with two parallel branches 490 and 491. Branch 490 is provided with a one-way valve 492 so that the air under pressure can flow freely through this pipe toward the cylinder but cannot return through this pipe. The other branch 491 through which the air must return or be exhausted from the cylinder is provided with a needle valve 493 by which the rate of flow can be controlled. In this way the movements of the piston are cushioned. At 493' is indicated a lubricating apparatus by means of which lubricant is injected into the air flow to lubricate the valves and cylinders.

The electrical power supply mains are shown at 494 and 495, the main driving motor at 73, the push button switches for respectively starting and stopping the apparatus are indicated at 496 and 497, and at 498 are grouped the usual starting mechanism and safety switches. The two spindle motors 225 and 225' are controlled by the cam groups *e* and *h* as already described. The pressure controlled switch 499 is connected through pipe 500 with the pressure main 484. This switch 499 will throw the electrically actuated apparatus out of operation unless adequate air pressure is present in the air supply piping.

In the figures disclosing the apparatus in detail, the electric wiring has been omitted, and it will be understood that suitable lubricating means and piping connections have been provided for the relatively moving parts, this lubricating system having been omitted to facilitate the disclosure.

It will be understood that when "optic" ware is not being made, the optic mechanism hereinabove described will be thrown out of operation. The heads will make the usual short dwell at the optic stations, but no operations will take place at these locations. Obviously, in a machine not adapted for making optic ware, the main driving cam 70 can be so designed as to omit the optic dwells entirely.

It will be understood that by suitably varying the form of the finishing molds, and the timing of the preceding operations to which the glass blank is subjected, a wide variety of hollow glassware may be made on an apparatus of this type.

I claim:

1. In a glass working apparatus, a plurality of glass treating mechanisms each positioned at a separate station, a plurality of similar independently movable glass forming mechanisms, and means for moving each forming mechanism independently to each station in properly timed relation to the movements of the other forming mechanisms so that only one of the forming mechanisms will be at any one station at any one time.

2. In a glass working apparatus, a gathering mechanism positioned at a gathering station, a molding mechanism positioned at a molding station, a plurality of glass forming mechanisms each adapted to receive a glass blank from the gathering mechanism, impart preliminary form to the blank, and cooperate with the molding mechanism to give final form to the blank, and means for independently moving the forming mechanisms from one station to the other with a dwell at each station.

3. In a glass working apparatus, a gathering mechanism positioned at a gathering station, a molding mechanism positioned at a molding station, a pair of similar independently movable glass forming mechanisms, and means for moving the forming mechanisms alternatively from one station to the other with a dwell at each station.

4. In a glass working apparatus, a gathering mechanism positioned at a gathering station, a molding mechanism positioned at a molding station, a pair of similar independently movable glass forming mechanisms, and a single rotary means for imparting a series of successive movements to each forming mechanism, including a dwell at each station and movements to and from the stations during each 360° of movement of the rotary member, the movements of the two forming mechanisms being 180° out of phase.

5. In a glass working apparatus, a gathering mechanism positioned at a gathering station, a molding mechanism positioned at a molding station, a pair of similar independently movable glass forming mechanisms mounted to swing about a center substantially midway between the stations through arcs of substantially 180° from one station to the other, and means for swinging the forming mechanisms alternatively between the stations with a dwell at each station.

6. In a glass working apparatus, a gathering mechanism positioned at a gathering station, a molding mechanism positioned at a molding station, a pair of similar independently movable glass forming mechanisms mounted to swing about a center substantially midway between the stations through arcs of substantially 180° from one station to the other, and a single constantly rotating means for imparting a series of successive movements to each forming mechanism during each 360° of movement of the rotary member including reverse swinging movements between the stations and a dwell at each station, the movements of the two forming mechanisms being substantially 180° out of phase.

7. In a glass working apparatus, a gathering mechanism positioned at a gathering station, a molding mechanism positioned at a molding station, a pair of similar independently movable glass forming mechanisms mounted to swing about substantially the same axis positioned midway between the stations, one moving through one arc of substantially 180° back and forth between the two stations with a dwell at each station and the other forming mechanism having similar movements through the opposite arc of 180°, and means for moving the two mechanisms in timed relation.

8. In a glass working apparatus, a gathering mechanism positioned at a gathering station, a molding mechanism positioned at a molding station, a pair of similar independently movable glass forming mechanisms mounted to swing about substantially the same axis positioned midway between the stations, one moving through one arc of substantially 180° back and forth between the two stations with a dwell at each station and the other forming mechanism having similar movements through the opposite arc of 180°, and a single rotary means for moving the two mechanisms in timed relation.

9. In a glass working apparatus, a pair of similar glass forming mechanisms mounted to move independently through different paths between a gathering station and a molding station, a gathering mechanism positioned at the gathering station, a molding mechanism positioned at the molding station, and means for automatically moving the two forming mechanisms in timed relation so that each will have a dwell at each of the stations, but only one of the forming mechanisms will be at the same station at any one time.

10. In a glass working apparatus, a pair of similar glass forming mechanisms mounted to move independently through different paths between a gathering station and a molding station, a gathering mechanism positioned at the gathering station, a molding mechanism positioned at the molding station, a pair of similar glass-treating mechanisms one positioned at a station on one of the two paths and the other at a similar station on the other path, and means for automatically and separately moving the two forming mechanisms in timed relation back and forth between the gathering and molding stations with a dwell at each station, and with a dwell at the treating station in its path when moving in one direction, so that only one of the forming mechanisms will be at the same station at any one time.

11. In a glass forming mechanism, a pair of similar glass forming mechanisms mounted to swing alternatively through opposite arcs of substantially 180° about the same axis between a pair of stations with a dwell at each station, and means for moving the mechanisms comprising a rotary cam mounted to rotate about the common axis, means for constantly rotating the cam, a pair of similar crank arms mounted to cooperate with the cam at positions spaced substantially 180° from one another, and similar gear connections between each crank arm and one of the swinging forming mechanisms.

12. In a glass forming mechanism, a pair of similar glass forming mechanisms each comprising a supporting head mounted to swing about a common vertical axis, the two heads swinging through opposite arcs of 180° between a pair of stations with a dwell at each station, and means for moving the heads comprising a pair of driving gears one connected with each head and mounted to independently oscillate about the axis, a cam mounted to rotate continuously about the axis, a pair of similar crank arms mounted to cooperate with the cam and be oscillated thereby the crank arms being spaced substantially 180° from one another about the cam, and gear connections between each crank arm and one of the driving gears.

13. In a glass working apparatus, a gathering ram positioned at a gathering station, a pair of glass forming mechanisms movable alternately into a temporarily fixed position at the gathering station to receive a glass blank from the ram, a constantly rotating cam, devices driven thereby to move the glass forming mechanisms alternatively to and from the gathering station with a dwell at the station, a cam-shaft, gearing for rotating the shaft twice for each rotation of the first-mentioned cam, a cam carried by the shaft, and devices driven from the last mentioned cam for controlling the operations of the ram.

14. In a glass forming apparatus, means for supporting and adjusting the apparatus with relation to a glass forming furnace comprising a pair of rails, a machine frame, a pair of parallel shafts extending transversely of the machine and journaled in the frame adjacent opposite ends of the bottom thereof, journals eccentrically mounted on the ends of the shafts, wheels mounted on the journals for supporting the frame from the rails, means for simultaneously rotating the shafts to raise or lower the frame by rotation of the eccentric journals, and means for rotating certain of the wheels to move the frame along the rails.

15. In a glass forming apparatus, means for supporting and adjusting the apparatus with relation to a glass forming furnace comprising a pair of rails, a machine frame, a pair of parallel shafts extending transversely of the machine and journaled in the frame adjacent opposite ends of the bottom thereof, journals eccentrically mounted on the ends of the shafts, wheels mounted on the journals for supporting the frame from the rails, a drive shaft journaled longitudinally of the frame at right angles to the first mentioned shafts, worm gearing between the drive shaft and each of the first mentioned shafts, and a second drive shaft journaled in the frame and having drive connections with the wheels at the two ends of one of the eccentric shafts.

16. In a glass forming apparatus, means for supporting and adjusting the apparatus with relation to a glass forming furnace comprising a pair of rails, a machine frame, a pair of parallel shafts extending transversely of the machine and journaled in the frame adjacent opposite ends of the bottom thereof, journals eccentrically mounted on the ends of the shafts, wheels mounted on the journals for supporting the frame from the rails, a drive shaft journaled longitudinally of the frame at right angles to the first mentioned shafts, worm gearing between the drive shaft and each of the first mentioned shafts, an intermediate shaft positioned parallel with one of the first mentioned shafts, brackets having spaced bearings one set journaled on the eccentric journals and the other on the intermediate shaft whereby this shaft is maintained in constantly spaced relation to the adjacent parallel shaft as the eccentrics are rotated, there being gear teeth formed on the wheels on the adjacent shaft, gears fixed on the intermediate shaft and meshing with the gear teeth on the wheels, and a second drive shaft substantially parallel to the first drive shaft and geared to the intermediate shaft.

17. In a glass forming apparatus, a spindle assembly comprising blank-holding means consisting of a receiver and a pair of movable jaws, a plurality of tubular members telescopically fitting over one another with capacity for limited relative longitudinal movements, the receiver and jaws being carried by certain of the telescoped members, a plunger carried by an inner member, means for preventing movement of the outermost member in one direction from a neutral position, means for preventing movement of the plunger-carrying member in the other direction from neutral position, means for positively moving an intermediate member successively in opposite directions from the neutral position, interconnections between the telescoped members whereby movement of the intermediate member in one direction from neutral position will open the jaws and elevate the receiver, and movement of the intermediate member in the opposite direction from neutral position will lower the blank-holding means with relation to the plunger so as to insert the plunger in the blank, means for rotating the outermost member, and connections whereby rotation of this outer member will rotate the blank-holding means.

18. In a glass forming apparatus, a spindle assembly comprising blank-holding means consisting of a receiver and a pair of movable jaws, a plurality of assembled members capable of limited relative longitudinal movements, the receiver and jaws being carried by certain of these members, a plunger carried by an inner one of the members, means for preventing movement of the plunger in one direction from a neutral position, means for supporting the outermost one of the members and preventing movement thereof in the opposite direction from the neutral position, and means for positively moving an intermediate member successively in opposite directions from the neutral position, and interconnections between the members whereby movement of the intermediate member in one direction will open the jaws and project the receiver through the open jaws, and movement of the intermediate member in the opposite direction will retract the blank-holding means about the plunger so as to insert the plunger in the blank.

19. In a glass working apparatus, a plurality of heads separately and intermittently movable from one station to another, means for supporting and moving the heads, a spindle carried by each head and rotatable about a vertical axis, means at one end of the spindle for supporting a glass blank, means for inverting the spindle end for end, and means for rotating the spindle about its vertical axis comprising a motor carried by the head, and gear connections between the motor and spindle.

20. In a glass working apparatus, a head movable from one station to another, means for supporting and moving the head, a spindle carried by the head and rotatable about a vertical axis, means at one end of the spindle for supporting a glass blank, means for inverting the spindle end for end, means for rotating the spindle about its vertical axis comprising a motor carried by the head, gear connections between the motor and spindle, a motor control switch, and mechanism actuated by the head-moving means for operating the switch.

21. In a glass working apparatus, a plurality of heads separately and intermittently movable from one station to another, means for supporting and moving the heads, a plurality of spindle assemblies, one for each head, each spindle assembly comprising a carriage, a spindle mounted in the carriage and rotatable about a vertical axis, means at one end of the spindle for supporting a glass blank, the carriage being mounted on the head for oscillation about a horizontal axis so that the spindle may be inverted end for end, a motor carried by the head, gear connections between the motor end spindle for rotat-means operating in timed relation to the movements of the head for swinging the carriage, and means operating on timed relation to the movements of the heads for controlling the motors at predetermined positions of the heads.

22. In a glass working apparatus, a plurality of heads separately and intermittently movable from one station to another, means for supporting and moving the heads, a plurality of spindle assemblies, one for each head, each spindle assembly comprising a carriage, a spindle mounted in the carriage and rotatable about a vertical axis, means at one end of the spindle for supporting a glass blank, the carriage being mounted on the head for oscillation about a horizontal axis so that the spindle may be inverted end for end, a motor carried by the head, gear connections between the motor and spindle for alternatively rotating and oscillating the spindle, and means comprising stationary cams and cam-engaging means on the heads for swinging the carriages and selectively adjusting the gear connections to rotate the spindles at predetermined positions of the heads and to oscillate the spindles at other predetermined positions.

23. In a glass working apparatus, a plurality of heads separately and intermittently movable from one station to another, means for supporting and moving the heads, a plurality of spindle assemblies, one for each head, each spindle assembly comprising a carriage, a spindle mounted in the carriage and rotatable about a vertical axis, means at one end of the spindle for supporting a glass blank, the carriage being mounted on the head for oscillation about a horizontal axis so that the spindle may be inverted end for end, a motor carried by the head, gear connections between the motor and spindle for alternatively rotating and oscillating the spindle, means comprising stationary cams and cam-engaging means on the heads for swinging the carriages and selectively adjusting the gear connections to rotate the spindles at predetermined positions of the heads, and to oscillate the spindles at other predetermined positions, and means responsive to the movements of the heads for controlling the respective motors.

24. In a glass working apparatus, a plurality of heads separately and intermittently movable from one station to another, means for supporting and moving the heads, a spindle carried by each head and rotatable about a vertical axis, means at one end of the spindle for supporting a glass blank, means for inverting the spindle end for end, and means for alternatively rotating and oscillating the spindle about its vertical axis comprising a motor carried by the head, a driving shaft, gear connections between the shaft and spindle, a pair of driving members rotatably mounted on the shaft, a clutch keyed to the shaft and alternatively engageable with the driving members, a motor shaft, gear connections between the motor shaft and one of the driving members for rotating the member continuously in one direction, connections between the motor shaft and the other driving member for oscillating the member, and means for shifting the clutch member comprising a stationary cam, a crank-arm positioned to be rocked by the cam, and operating connections between the crank arm and clutch.

25. In a glass working apparatus, a plurality of heads separately and intermittently movable from one station to another, means for supporting and moving the heads, a spindle carried by each head and rotatable about a vertical axis, means at one end of the spindle for supporting a glass blank, means for inverting the spindle end for end, and means for alternatively rotating and oscillating the spindle about its vertical axis comprising a motor carried by the head, a driving shaft, gear connections between the shaft and spindle, a pair of driving members rotatably mounted on the shaft, a clutch keyed to the shaft and alternatively engageable with the driving members, a motor shaft, gear connections between the motor shaft and one of the driving members for rotating the member continuously in one direction, connections between the motor shaft and the other driving member for oscillating the member, means for shifting the clutch member comprising a stationary cam, a crank-arm positioned to be rocked by the cam, operating connections between the crank arm and clutch, and a spring for normally moving the clutch to a position for locking the continuously rotating driving member to the shaft.

26. In a glass working apparatus, a plurality of heads separately and intermittently movable from one station to another, means for supporting and moving the heads, a spindle carried by each head and rotatable about a vertical axis, means at one end of the spindle for supporting a glass blank, means for inverting the spindle end for end, and means for alternatively rotating and oscillating the spindle about its vertical axis comprising a motor carried by the head, a driving shaft, gear connections between the shaft and spindle, a pair of driving members rotatably mounted on the shaft, a clutch keyed to the shaft and alternatively engageable with the driving members, a motor shaft, gear connections between the motor shaft and one of the driving members for rotating the member continuously in one direction, connections between the motor shaft and the other driving member for oscillating the member, and means for shifting the clutch member at predetermined positions of the head.

27. In a glass working apparatus, a plurality of heads separately and intermittently movable from one station to another, means for supporting and moving the heads, a spindle carried by each head and rotatable about a vertical axis, means at one end of the spindle for supporting a glass blank, means for inverting the spindle end for end, and means for alternatively rotating and oscillating the spindle about its vertical axis comprising a motor carried by the head and adapted to operate continuously in one direction, alternative gear trains between the motor and spindle one adapted to impart continuous rotary motion and the other oscillating motion, a shiftable clutch member adapted to alternatively make either of the gear trains effective, and means for shifting the clutch member at predetermined positions of the head.

28. In a glass working apparatus, a plurality of heads separately and intermittently movable from one station to another, means for supporting and moving the heads, a spindle carried by each head and rotatable about a vertical axis, means at one end of the spindle for supporting a glass blank, means for inverting the spindle end for end, and means for alternatively rotating or/and oscillating the spindle about its vertical axis comprising a motor carried by the head, a driving shaft, gear connections between the shaft and spindle, a pair of driving members rotatably mounted on the shaft, a clutch keyed to the shaft and alternatively engageable with the driving members, a motor shaft, gear connections between the motor shaft and one of the driving members for rotating the member continuously in one direction, connections between the motor shaft and the other driving member for oscillating the member comprising a crank-arm rotated by the motor shaft, a crank arm of greater radius connected with the driving member and a link connecting the crank-arms, means for shifting the clutch member comprising a stationary cam, a crank-arm positioned to be rocked by the cam, and operating connections between the crank-arm and clutch.

29. In a glass working apparatus, a plurality of heads separately and intermittently movable from one station to another, means for supporting and moving the heads, a spindle carried by each head and rotatable about a vertical axis, means at one end of the spindle for supporting a glass blank, means for inverting the spindle end for end, and means for alternatively rotating and oscillating the spindle about its vertical axis comprising a motor carried by the head, and means responsive to the movements of the respective heads for causing the spindles to be inverted and selectively rotated or oscillated at predetermined positions of the heads.

30. In a glass working apparatus, in combination with a glass working spindle having a member movable axially of the spindle alternatively in opposite directions from a neutral position to effect different spindle operations, means for moving said member comprising a cylinder, a piston in the cylinder, a piston rod projecting from the cylinder, means at the free end of the piston rod for engaging the member, means for alternatively moving the piston in opposite directions from a neutral position intermediate the ends of the cylinder comprising an auxiliary piston movable in one end portion of the cylinder, stop means for limiting the inward movement of the auxiliary piston at a position where it contacts with the main piston when in neutral position, conduits for fluid under pressure leading into the cylinder adjacent each end thereof and at a location between the pistons, and valves for controlling the flow of pressure-fluid through the conduits into or out of the cylinder.

31. In a glass working apparatus, in combination with a glass working spindle having a member movable axially of the spindle alternatively in opposite directions from a neutral position to effect different spindle operations, means for moving said member comprising a cylinder, a piston in the cylinder, a piston rod projecting from the cylinder, means at the free end of the piston rod for engaging the member, means for alternatively moving the piston in opposite directions from a neutral position intermediate the ends of the cylinder comprising an auxiliary piston movable in one end portion of the cylinder, stop means for limiting the inward movement of the auxiliary piston at a position where it contacts with the main piston when in neutral position, conduits for fluid under pressure leading into the cylinder adjacent each end thereof and at a location between the pistons, a valve adapted to direct pressure fluid alternatively into either end of the cylinder and simultaneously exhaust the other end portion of the cylinder, a second valve adapted to either direct pressure fluid into the space between the pistons or exhaust the space, and means for moving the valves in timed relation to one another.

32. In a glass working apparatus, in combination with a head movable from one station to another with a dwell at each station and a glass-working spindle carried by the head, said spindle having a member movable axially of the spindle alternatively in opposite directions from a neutral position to effect different spindle operations, means located at one of the stations for moving the member comprising a cylinder, a piston in the cylinder, a piston rod projecting from the cylinder, means at the free end of the piston rod for engaging the member, means for controlling the flow of fluid under pressure into and from the cylinder so as to alternatively move the piston in opposite directions from a neutral position intermediate the ends of the cylinder, said means including valves, and means for operating the valves in timed relation to the movements of the head.

33. In a glass working apparatus, in combination with a head movable from one station to another and a glass-working spindle carried by the head, said spindle having a member movable axially of the spindle alternatively in opposite directions from a neutral position to effect different spindle operations, means located at one of the stations for moving the member comprising a cylinder, a piston in the cylinder, a piston rod projecting from the cylinder, means at the free end of the piston rod for engaging the member, means for alternatively moving the piston in opposite directions from a neutral position intermediate the ends of the cylinder comprising an auxiliary piston movable in one end portion of the cylinder, stop means for limiting the inward movement of the auxiliary piston at a position where it contacts with the main piston when in neutral position, conduits for fluid under pressure leading into the cylinder adjacent each end thereof at a location between the pistons, valves for controlling the flow of pressure-fluid through the conduits into and out of the cylinder, and means for operating the valves in timed relation to the movements of the head.

34. In a glass working apparatus, in combination with a head movable from one station to another with a dwell at each station and a glass working spindle carried by the head, said spindle having a member movable axially of the spindle alternatively in opposite directions from a neutral position to effect different spindle operations, movable means located at each of the stations for engaging the member when at that station and imparting certain of said axial movements thereto.

35. In a glass working apparatus, in combination with a head movable from one station to another with a dwell at each station and a glass working spindle carried by the head, said spindle having a member movable axially of the spindle alternatively in opposite directions from a neutral position to effect different spindle operations, movable means located at each of the stations for engaging the member when at that station and imparting certain of said axial movements thereto, and means operated in timed relation to the movements of the head for controlling the movements of the several means which move the member.

36. In a glass working apparatus, in combination with a head movable from one station to another and a glass working spindle carried by the head, said spindle having a member movable axially of the spindle alternatively in opposite directions from a neutral position to effect different spindle operations, means located at one of the stations for moving the member comprising a cylinder, a piston in the cylinder, a piston rod projecting from the cylinder and comprising a pivotally connected rod extension, means at the free end of the extension for engaging the spindle member, means for controlling the flow of fluid into and from the cylinder so as to alternatively move the piston in opposite directions from a neutral position intermediate the ends of the cylinder said means including valves, means for operating the valves in timed relation to the movements of the head, and means for swinging the piston-rod extension out of engagement with the spindle member before the head moves from the station.

37. In a glass working apparatus, in combination with a head movable from one station to another and a glass working spindle carried by the head, said spindle having a member movable axially of the spindle alternatively in opposite directions from a neutral position to effect different spindle operations, means located at one of the stations for moving the member comprising a cylinder, a piston in the cylinder, a piston rod projecting from the cylinder and comprising a pivotally connected rod extension, means at the free end of the extension for engaging the spindle member, a swinging frame in which the rod extension is guided, a stop on the frame for limiting movement of a spindle part in one direction, means for controlling the flow of fluid into and from the cylinder so as to alternatively move the piston in alternate directions from a neutral position intermediate the ends of the cylinder, means for swinging the frame into or out of operative alignment with the spindle parts, and means for operating the two last mentioned means in timed relation to the movements of the head.

38. In a glass working apparatus, in combination with a head movable from one station to another and a glass working spindle carried by the head, said spindle having a member movable axially of the spindle to effect different spindle operations, means located at one of the stations for moving the member comprising a cylinder, a piston in the cylinder, a piston rod projecting from the cylinder and comprising a pivotally connected rod extension, means at the free end of the extension for engaging the spindle member, a swinging frame in which the rod extension is pivoted, a stop on the frame for limiting movement of a spindle part in one direction, means for controlling the flow of fluid into and from the cylinder so as to move the piston and rod in alternate directions, means for swinging the frame into or out of operative alignment with the spindle parts, and means for operating the two last mentioned means in timed relation to the movements of the head.

39. In a glass working apparatus in combination with a plurality of heads movable alternatively to and from a station with a dwell at the station, a spindle carried by each head and adapted to suspend a hollow glass blank and deliver air thereinto to expand the blank, and a valve for controlling the flow of air into the blank, a sectional mold positioned at the station and adapted to alternatively cooperate with the spindles, and means for elevating the mold and closing the sections thereof about the blank, said means including fluid pressure cylinders, and means operated in timed relation to the movements of the head for controlling the flow of pressure fluid into the cylinders and for controlling the valves.

40. In a glass working apparatus in combination with a plurality of heads movable alternatively to and from a station with a dwell at the station, a spindle carried by each head and adapted to suspend a hollow glass blank and deliver air thereinto to expand the blank, and a valve for controlling the flow of air into the blank, a sectional mold positioned at the station and adapted to alternatively cooperate with the spindles, a tank for cooling liquid, a pivoted carriage for supporting the mold, means including a fluid pressure cylinder for swinging the carriage to alternately raise the mold into operating position or lower the mold into the tank, means including a fluid pressure cylinder for closing and opening the mold sections and for operating the valves, and means operated in timed relation to the movements of the head for controlling the flow of pressure fluid into the cylinders.

41. In a glass working apparatus in combination with a plurality of heads movable separately to and from a station each with a dwell at the station, a spindle carried by each head and adapted to suspend a hollow glass blank and deliver air thereinto to expand the blank, a valve movable with the head for controlling the flow of air into the blank, a conduit carried by the head for directing cooling air toward the blank, and a valve movable with the head for controlling the flow of air through the conduit, a sectional mold positioned at the station and adapted to alternatively cooperate with the spindles, movable means positioned at the station for elevating the mold and closing the sections about a blank suspended from one of the spindles and for simultaneously actuating the valves, and means operated in timed relation to the movements of the head for controlling the last mentioned means.

42. In a glass working apparatus in combination with a plurality of heads movable separately to and from a station each with a dwell at the station, a spindle carried by each head and adapted to suspend a hollow glass blank and deliver air thereinto to expand the blank, a valve movable with the head for controlling the flow of air into the blank, a conduit carried by the head for directing cooling air toward the blank, and a valve movable with the head for controlling the flow of air through the conduit, a sectional mold positioned at that station and adapted to alternatively cooperate with the spindles, movable means positioned at the station including fluid pressure cylinders for elevating the mold and closing the sections about a blank suspended from one of the spindles and for actuating the valves, and means operated in timed relation to the movements of the head for controlling the flow of pressure fluid into the cylinders.

43. In a glass working apparatus, in combination with a spindle adapted to support a hollow glass blank and direct air thereinto to expand the blank, means for moving the spindle to and from a station with a dwell at the station, and a valve for controlling the flow of air into the blank, a mold at the station, a fluid pressure cylinder, a piston in the cylinder, connections between the piston and mold for elevating the mold about the blank and for lowering the mold, means for controlling the flow of pressure fluid into the cylinder in timed relation to the spindle movements, and means operated by the piston connections for controlling the valve.

44. In a glass working apparatus, in combination with a spindle adapted to support a hollow glass blank and direct air thereinto to expand the blank, means for moving the spindle to and from a station with a dwell at the station, and a valve for controlling the flow of air into the blank, a mold at the station, a fluid pressure cylinder, a piston in the cylinder, a carriage for supporting the mold, a piston rod connecting the piston with the carriage, means for controlling the flow of pressure fluid into the cylinder in timed relation to the spindle movements, and means operated by the carriage for controlling the valve.

45. In a glass working apparatus, in combination with a spindle adapted to support a hollow glass blank and direct air thereinto to expand the blank, means for moving the spindle to and from a station with a dwell at the station, and a valve for controlling the flow of air into the blank, a mold at the station, a fluid pressure cylinder, a piston in the cylinder, a carriage for supporting the mold, a piston rod extending from the piston and projecting upwardly from the cylinder and through the carriage, a spring interposed between a portion of the rod and the carriage, means for limiting the upward movement of the carriage, and means operated by further upward movement of the piston rod to control the valve.

46. In a glass working apparatus, in combination with a pair of glass working heads movable alternately between a pair of glass working stations, a rotary driving means and connections for causing one complete cycle of operations for each head for each rotation of the means, a plurality of operating means located at the stations for successively performing operations on the glass blanks carried by both of the heads, a plurality of operating means associated individually with each head, a pair of cam shafts, connections between the main driving means and the cam shafts whereby one cam is rotated twice for each rotation of the main driving means and the other cam shaft is rotated once for each rotation of the main driving means, a plurality of cams on the first cam shaft for controlling the operating means at the stations, and a plurality of cams on the second cam shaft for controlling the operating means individual to each head.

47. In a glass working apparatus, in combination with a head movable from one station to another with a dwell at each station, a glass working spindle rotatably carried by the head, means for rotating the spindle, the spindle comprising a plurality of spindle parts relatively movable axially of the spindle, a blank-receiving cup carried by one spindle part, a pair of separable jaws for holding the blank in the cup and carried by a second spindle part, a plunger positioned in the cup and carried by a third spindle part and adapted to be projected into the blank, a spindle member movable axially of the spindle alternatively in opposite directions from a neutral position, spring means for normally holding the spindle parts and member in this neutral position with the jaws closed and the plunger retracted, stop means for limiting the axial movements of certain of the spindle parts, and movable means located at one of the stations and adapted to engage and move the spindle member successively in opposite directions from neutral position, movement of the member in one direction from neutral position serving to open the jaws, and movement of the member in the opposite direction from neutral position causing the plunger to be projected into the blank held by the cup.

48. In a glass working apparatus, in combination with a head movable from one station to another with a dwell at each station, a glass working spindle rotatably carried by the head, means for rotating the spindle, the spindle comprising a plurality of spindle parts relatively movable axially of the spindle, a blank-receiving cup carried by one spindle part, a pair of separable jaws for holding the blank in the cup and carried by a second spindle part, a plunger positioned in the cup and carried by a third spindle part, and adapted to be projected into the blank, a spindle member movable axially of the spindle alternatively in opposite directions from a neutral position, spring means for normally holding the spindle parts and member in this neutral position with the jaws closed and the plunger retracted, stop means for limiting the axial movements of certain of the spindle parts, means at one of the stations for limiting movement of the plunger in one direction, and means at this station for engaging and moving the spindle member successively in opposite directions from the neutral position, movement in one direction opening the jaws, and movement in the opposite direction from neutral position moving the cup with relation to the plunger to cause the plunger to be projected into the glass blank held by the cup.

49. In a glass working apparatus, in combination with a head movable from one station to another with a dwell at each station, a glass working spindle rotatably carried by the head, means for rotating the spindle, the spindle comprising a plurality of spindle parts relatively movable axially of the spindle, a blank-receiving cup carried by one spindle part, a pair of separable jaws for holding the blank in the cup and carried by a second spindle part, a plunger positioned in the cup and carried by a third spindle part and adapted to be projected into the blank, a spindle member movable axially of the spindle alternatively in opposite directions from a neutral position, spring means for normally holding the spindle parts and member in this neutral position with the jaws closed and the plunger retracted, stop means for limiting the axial movements of certain of the spindle parts, means at one of the stations for limiting movement of the plunger in one direction, and means at this station for engaging and moving the spindle member successively in opposite directions from the neutral position, movement in one direction moving the cup in that direction and opening the jaws, and movement of the member in the opposite direction from neutral position moving the cup in that direction with relation to the plunger to cause the plunger to be projected into the blank held by the cup.

50. In a glass working apparatus, in combination with a head movable from one station to another with a dwell at each station, a glass working spindle rotatably carried by the head, means for rotating the spindle, the spindle comprising a plurality of spindle parts relatively movable axially of the spindle, a blank-receiving cup carried by one spindle part, a pair of separable jaws for holding the blank in the cup and carried by a second spindle part, a plunger positioned in the cup and carried by a third spindle part and adapted to be projected into the blank, a spindle member movable axially of the spindle alternatively in opposite directions from a neutral position, spring means for normally holding the spindle parts and member in this neutral position with the jaws closed and the plunger retracted, stop means for limiting the axial movements of certain of the spindle parts, means at one of the stations for limiting movement of the plunger in one direction, and means at this station for engaging and moving the spindle member successively in opposite directions from the neutral position, movement in one direction opening the jaws, and movement in the opposite direction from neutral position moving the cup with relation to the plunger to cause the plunger to be projected into the glass blank held by the cup, means located at a second station for engaging and moving the member to open the jaws, and means operated in timed relation to the movements of the head for controlling the movements of the member-actuating means at the two stations.

HAROLD R. SCHUTZ.

CERTIFICATE OF CORRECTION.

Patent No. 2,030,328.                                    February 11, 1936

HAROLD R. SCHUTZ.

It is hereby certified that error appears in the printed specification of the above numbered patent requiring correction as follows: Page 5, second column, line 66, after "spindles" insert F; page 8, second column, line 9, for the numeral "44" read 244; page 16, first column, line 31, claim 21, strike out the words "means operating in timed relation" and insert instead the syllable and words ing the spindle, means responsive; and line 33, same claim, for "on" read in; and that the said Letters Patent should be read with these corrections therein that the same may conform to the record of the case in the Patent Office.

Signed and sealed this 31st day of March, A. D. 1936.

Leslie Frazer (Seal)                                    Acting Commissioner of Patents.